US010145073B2

(12) United States Patent
Levin

(10) Patent No.: US 10,145,073 B2
(45) Date of Patent: Dec. 4, 2018

(54) WATERCRAFT DOCKING STRUCTURE

(71) Applicant: Designer Direct, Inc., Des Plaines, IL (US)

(72) Inventor: Kerry Ira Levin, Des Plaines, IL (US)

(73) Assignee: Designer Direct, Inc., Des Plaines, IL (US)

( * ) Notice: Subject to any disclaimer, the term of this patent is extended or adjusted under 35 U.S.C. 154(b) by 0 days.

(21) Appl. No.: 15/444,366

(22) Filed: Feb. 28, 2017

(65) Prior Publication Data

US 2017/0254038 A1 Sep. 7, 2017

Related U.S. Application Data

(60) Provisional application No. 62/302,873, filed on Mar. 3, 2016.

(51) Int. Cl.
*E02B 3/24* (2006.01)
*B63B 21/00* (2006.01)
*B63B 35/71* (2006.01)

(52) U.S. Cl.
CPC .......... *E02B 3/24* (2013.01); *B63B 2021/001* (2013.01); *B63B 2035/715* (2013.01); *Y02A 30/36* (2018.01)

(58) Field of Classification Search
CPC ....... B63C 3/00; E02B 3/24; B63B 2035/715; B63B 21/20
See application file for complete search history.

(56) References Cited

U.S. PATENT DOCUMENTS

| 3,151,595 A * | 10/1964 | Stainbrook | ............... E02B 3/24 |
| | | | 114/230.25 |
| 4,363,284 A * | 12/1982 | Monroe | .................. B63B 17/02 |
| | | | 114/361 |
| 4,462,329 A * | 7/1984 | Brushaber | ............... B63B 21/54 |
| | | | 114/219 |
| 4,653,420 A * | 3/1987 | Johnson | .................. B63B 59/02 |
| | | | 114/219 |

(Continued)

OTHER PUBLICATIONS

West Marine Stainless Steel Boarding Handle, https://www.westmarine.com/buy/west-marine-stainless-steel-boarding-handle--14910707?green=9C5F9049-5C2E-5235-9749-2BD7446BCD5C&cm_sp=Onsite-Recs-_-MB-_-PDP (Mar. 11, 2014).

(Continued)

*Primary Examiner* — Anthony D Wiest
(74) *Attorney, Agent, or Firm* — Steven L. Fisher-Stawinski

(57) ABSTRACT

A structure includes a bracket and a vertical member. The vertical member includes a vertical member top end and a vertical member bottom end. The vertical member is affixed to the bracket. The structure further includes at least one bumper. The at least one bumper is affixed to the vertical member bottom end via a bumper connecting structure. The structure further includes an arm member. The arm member includes an arm member first end and an arm member second end. The arm member second end is affixed to the vertical member top end. In another aspect, a structure includes a support, and affixed to the support, a bracket. The structure further includes, affixed to the support via a bumper connecting structure, at least one bumper. The structure further includes, affixed to the support, an arm member.

17 Claims, 14 Drawing Sheets

(56) References Cited

U.S. PATENT DOCUMENTS

| | | | | |
|---|---|---|---|---|
| 5,090,842 A * | 2/1992 | Montgomery | | B63C 3/06 114/44 |
| 5,113,702 A * | 5/1992 | Capps | | E02B 3/24 114/219 |
| 5,245,940 A * | 9/1993 | Rockwood | | B63B 27/36 114/48 |
| 5,269,044 A | 12/1993 | Marion | | |
| 5,531,177 A * | 7/1996 | Urbank | | B63C 3/06 114/366 |
| 5,701,834 A * | 12/1997 | Lyons | | B63C 3/06 114/48 |
| 5,749,313 A * | 5/1998 | Shackelford, Jr. | | B63C 3/06 114/48 |
| 6,119,616 A * | 9/2000 | Hannasch | | B63B 21/00 114/230.1 |
| 6,178,909 B1 * | 1/2001 | Palmer | | E02B 3/26 114/219 |
| 6,932,021 B1 * | 8/2005 | Martini | | E01D 15/24 114/362 |
| 7,213,526 B1 * | 5/2007 | Hamilton | | B63C 3/06 114/44 |
| 9,556,640 B2 | 1/2017 | Levin | | |
| 2002/0172581 A1 * | 11/2002 | Maney | | B60P 1/4421 414/462 |
| 2008/0216734 A1 | 9/2008 | Czipri | | |
| 2010/0107953 A1 * | 5/2010 | Selway | | E02B 3/26 114/219 |
| 2016/0368571 A1 | 12/2016 | Levin | | |

OTHER PUBLICATIONS

Go-float.com, ParkPort Dockside Mount & Assist, http://www.go-float.com/_p/prd13/4572173361/product/parkport-dockside-mount-%26-assist (Oct. 18, 2016) Grace Period Disclosure.

* cited by examiner

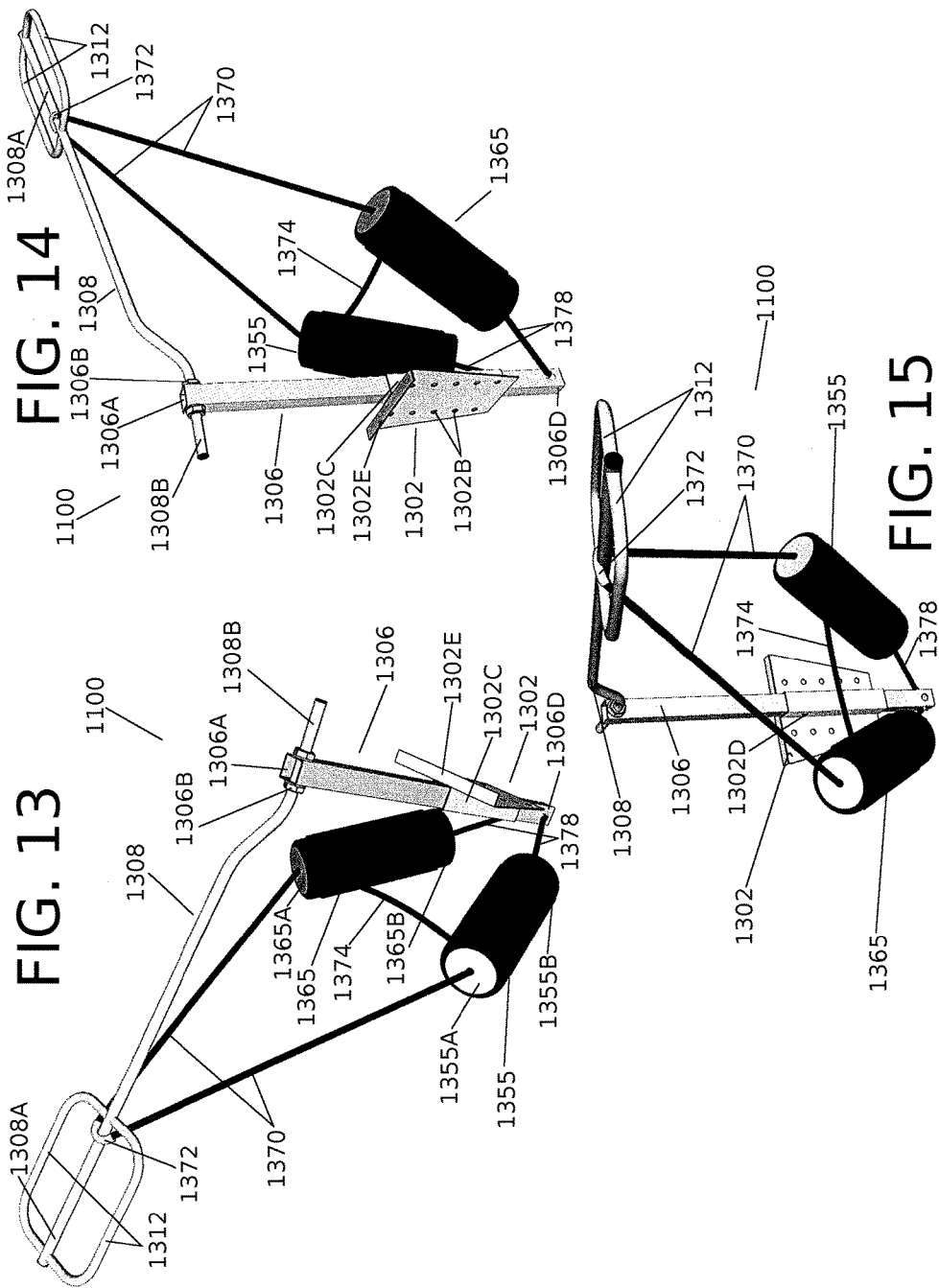

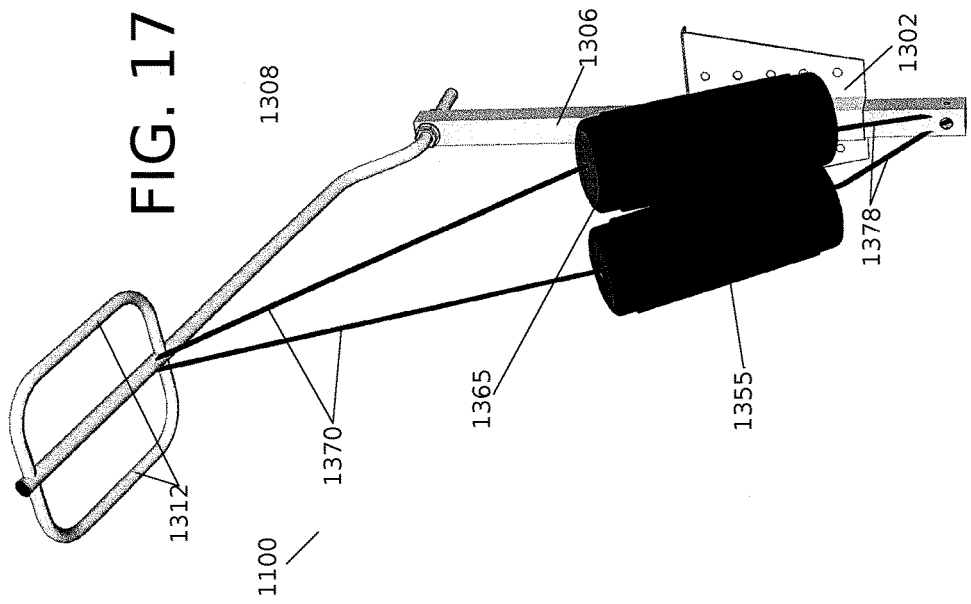
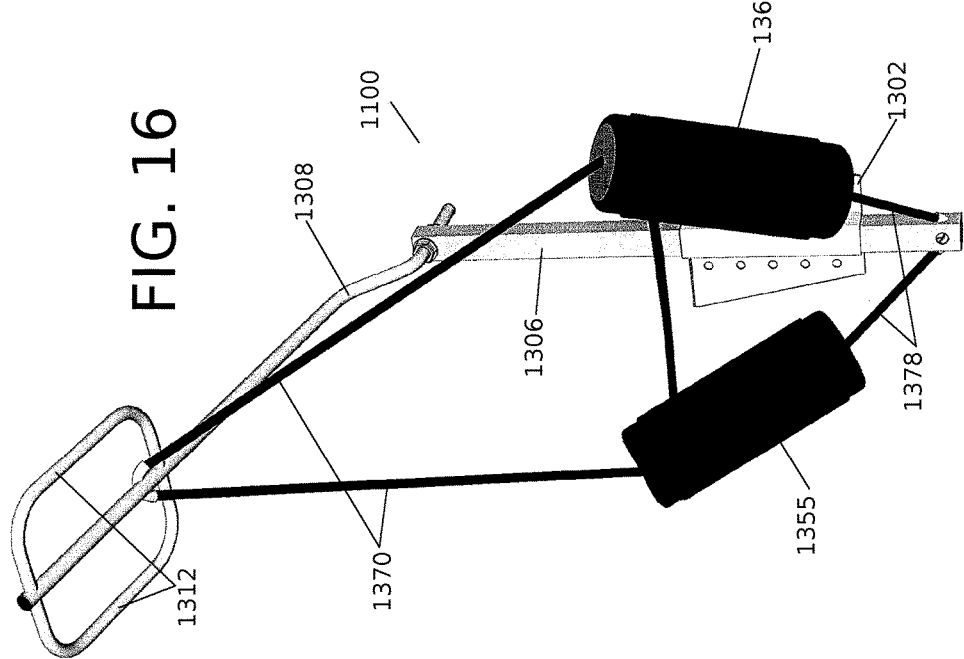

WATERCRAFT DOCKING STRUCTURE

CROSS-REFERENCE TO RELATED APPLICATIONS

This application claims the benefit of U.S. Provisional Application No. 62/302,873, filed on Mar. 3, 2016, which is hereby incorporated by reference.

STATEMENT REGARDING FEDERALLY SPONSORED RESEARCH OR DEVELOPMENT

Not Applicable

PARTIES TO A JOINT RESEARCH AGREEMENT

Not Applicable

REFERENCE TO SEQUENCE LISTING, A TABLE, OR A COMPUTER PROGRAM LISTING COMPACT DISK APPENDIX

Not Applicable

BACKGROUND

The invention relates generally to accessory structures for docks, and in particular to accessory structures for facilitating the loading and mooring of small watercraft.

Small watercraft are widespread in recreational as well as professional applications. While small, such watercraft are usually moored in the same manner as full sized speedboat, that is, against a dock, using boat bumpers, tires, or other shock absorber to prevent the dock from damaging the boat or small watercraft and vice versa. Users of small watercraft continue to be frustrated by the overall work required in mooring and loading. Simplifying the mooring and loading process would allow existing small watercraft users to get more value and utility out of their small watercraft.

SUMMARY

According to an aspect of the invention, a structure includes a bracket a bracket and a vertical member. The vertical member includes a vertical member top end and a vertical member bottom end. The vertical member is affixed to the bracket. The structure further includes at least one bumper. The at least one bumper is affixed to the vertical member bottom end via a bumper connecting structure. The structure further includes an arm member. The arm member includes an arm member first end and an arm member second end. The arm member second end is affixed to the vertical member top end.

According to another aspect of the invention, a structure includes a support, and, affixed to the support, a support mounting means for mounting the support to a dock, and, also affixed to the support, a watercraft contacting means for contacting the structure to a watercraft. The structure further includes an arm member, which includes an arm member first end and an arm member second end. The arm member is affixed to the support at the arm member second end. The arm member first end extends above the watercraft.

According to another aspect of the invention, a structure includes a support, and affixed to the support, a bracket. The structure further includes, affixed to the support via a bumper connecting structure, at least one bumper. The structure further includes, affixed to the support, an arm member.

A parts kit for a structure according to embodiments of the invention and methods of use of a structure according to embodiments of the invention are also disclosed.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

BRIEF DESCRIPTION OF THE DRAWINGS

The accompanying drawings are included to provide a further understanding of the invention and are incorporated into and constitute a part of the specification. They illustrate one embodiment of the invention and, together with the description, serve to explain the principles of the invention.

FIG. 13 is an elevated right-rear perspective view of a structure according to at least one embodiment of the invention.

FIG. 14 is an elevated left-rear perspective view of a structure according to at least one embodiment of the invention.

FIG. 15 is a front-left perspective view of a structure according to at least one embodiment of the invention.

FIG. 16 is a lowered front-right perspective view of a structure according to at least one embodiment of the invention.

FIG. 17 is a lowered front-right perspective view of a structure according to at least one embodiment of the invention, in a collapsed configuration.

DETAILED DESCRIPTION

Figure 1:
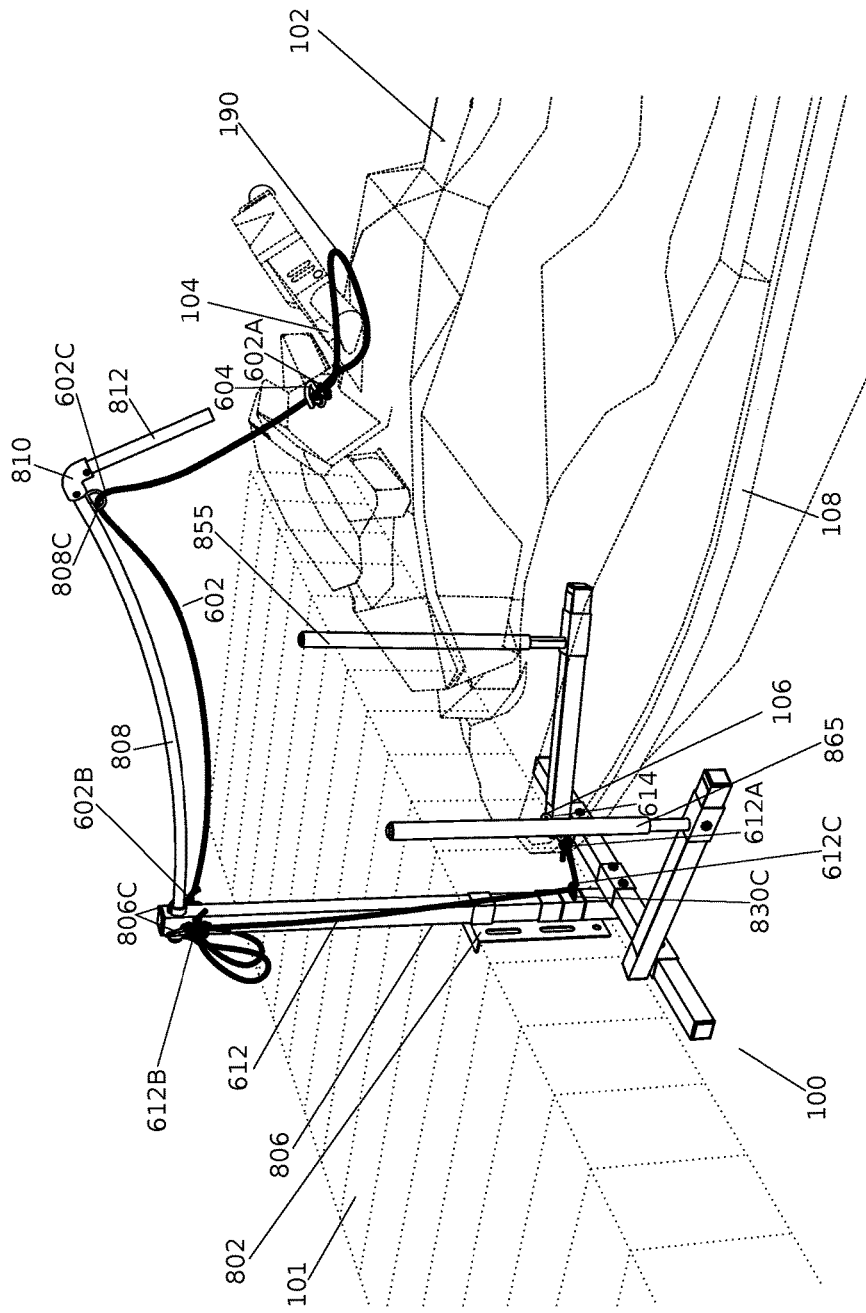
FIG. 1 is a left-front perspective view of a structure according to at least one embodiment of the invention in a configuration for docking a powered personal watercraft.

The Applicant submits that the present invention provides a simple perpendicular dock-mounted, adjustable, cantilevered system for parking and boarding powered personal watercraft, canoes, kayaks, paddleboats, paddleboard, personal boats, and other small watercraft. As used herein, the term "powered personal watercraft" refers to a watercraft, usually but not necessarily propelled by jet rather than propeller, on which a pilot and 1-2 additional rider(s) are seated astride of or on top of, as opposed to within, the hull, often in an inline configuration with additional riders seated behind the passenger, as would riders and passengers of a motorcycle. Powered personal watercraft may be of the kind commonly referred to by the terms "waverunner" or "wave runner". The Applicant notes that U.S. Trademark Reg. No. 1508023 to YAMAHA HATSUDOKI KABUSHIKI KAISHA CORPORATION covers the term "WAVE RUNNER" as source identifier for "WATER SCOOTER AND STRUCTURAL PARTS THEREFOR". The term "powered personal watercraft" as used herein, may be understood to include, but not be limited to, the goods identified by the registered trademark "WAVE RUNNER".

As used herein, the term "personal boat" refers to a watercraft, usually but not necessarily propelled by jet rather than propeller, in which a pilot and 1-2 additional rider(s) are seated within, as opposed to astride or on top of, the hull, often seated abreast or in a configuration wherein the additional riders face the pilot. The Applicant notes that U.S. Trademark Reg. No. 3611047 (now canceled) to GO-FLOAT, LLC covers the term "GO FLOAT" as source identifier for "PERSONAL WATERCRAFT, NAMELY, SMALL ELECTRIC BOAT". As used herein, the term "personal boat" as used herein, may be understood to include, but not be limited to, the goods identified by the formerly registered trademark "GO FLOAT".

The Inventor has observed that the present state of the art includes relatively costly boat lifts and drive on dock mechanisms that can accomplish parking and boarding of small watercraft, but that there currently exists no economical way to moor watercraft perpendicular to a pier. Systems according to some, but not necessarily all embodiments of the invention have the potential to save money due to efficient design, save space by fitting more watercraft along a pier, and add passenger safety to the boarding/exiting process. Additionally, the Inventor has observed that the present state of the art includes various docking racks for securing canoes, kayaks, and other slender watercraft parallel to a pier, but that the present state of the art does not include any apparatus that provides stabilizing legs in combination with a cantilevered handlebar.

In various embodiments, an assembly according to the present invention may connect to a pier with a dock mounting bracket, which may be made of steel (stainless or treated), aluminum, or other rust-resistant material, for example a composite material. Through the bracket, according to the various embodiments, may be connected an adjustable vertical tubular spine, the bottom of which may anchor the support bumpers, and the top to which a horizontal support rail may connect and cantilever out over the watercraft.

According to the various embodiments, this multi-purpose horizontal support rail may be (1) gripped by passengers for support while boarding and exiting the watercraft; (2) used by passengers to pull the watercraft into docking; (3) positioned with and pushed off from when exiting the dock; (4) positioned as the uppermost connection for the support bumpers, and (5) positioned as dock line holders to keep the support bumpers out of the water.

In the various embodiments, one or more dock lines may run through or parallel to the vertical spine, with which the watercraft may be pulled in and secured to the assembly. One or two buoyant dock bumpers may be secured below to the spine bottom and above to the horizontal rail, to provide a cushioned receiver to cradle the bow of the watercraft nose-in to the pier.

When connected to a floating pier, the structure according to the various embodiments may be secured so that the structure causes the docked watercraft to float consistently with the pier as water levels fluctuate. When the structure according to various embodiment is connected to a fixed pier, the ballast of the bumpers allows the secured watercraft to float up and down to maintain a secure and consistent docking position, regardless of changes in water levels. Whether the structure according to the various embodiments is affixed to a fixed or floating pier, the watercraft may be understood always to be secured conveniently to the pier in a nose-in position.

According to the various embodiments, the entire assembly can be removed and stored seasonally, or left connected to the pier year round, whether the pier remains in water or is stored on land. The entire unit, according to the various embodiments, may be shipped and sold assembled or broken down into a compact carton or bundle for economical transportation and storage. An optional cradle system may be added to allow kayaks and canoes to be supported parallel, rather than perpendicular, to the pier for easy boarding and exiting.

Figure 9:
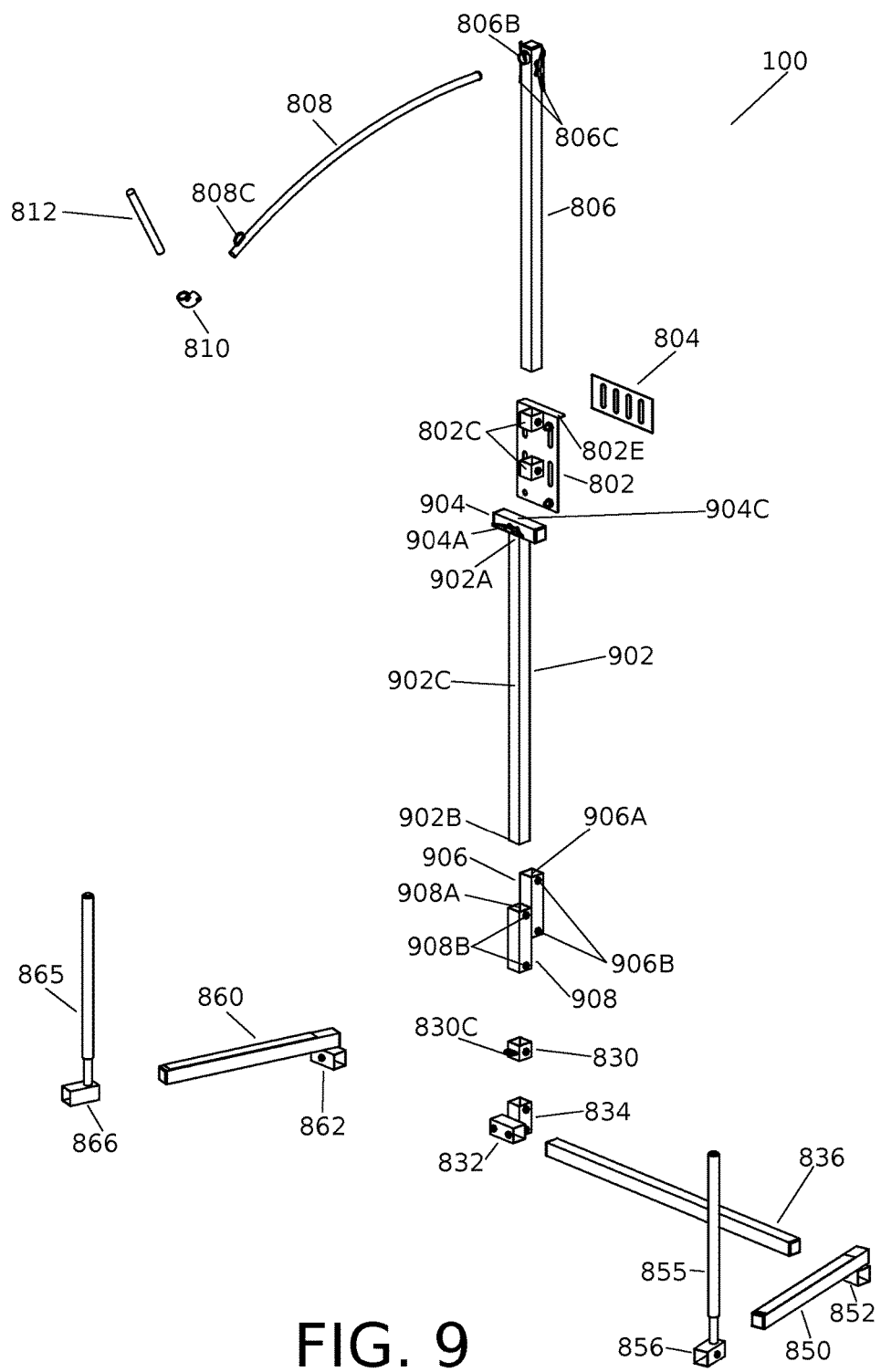
FIG. 9 is an exploded view of a structure according to at least one embodiment of the invention, with a water level adjustment extension installed.

The inventor has further observed that structures and/or systems according to various embodiments of the invention provide efficient design and production economy (FIG. 10 and discussion), low shipping costs (FIG. 10 and discussion), and easy installation and removal (FIG. 1 and discussion). Structures according to the various embodiments also provide the ability to minimize the amount of pier required to safely moor multiple watercrafts, because bow to pier or aft to pier docking uses less linear space than side to pier, which is the only option when tying up conventionally. The inventor has further observed that embodiments of the invention have the potential to enhance user safety in boarding and exiting their watercraft (FIGS. 1-5 and discussion). Further enhancing ease and safety, when structures according to various embodiments are connected to a floating pier, the invention may be configured so that the docked watercraft floats consistently with the pier as water levels fluctuate (FIGS. 5, 9, and discussion). When connected to a fixed pier, structures according to various embodiments may be secured in circumstances when water levels remain consistent, or left unsecured to allow the tethered watercraft to float up and down in circumstances when water levels vary.

The inventor has further observed that various embodiment have the potential to be removed and stored seasonally, or left fully or partially connected to the pier year round, whether the pier remains in water or is stored on land. Structures according to the various embodiments may be broken down to be transported in one or more small box (i.e., reasonable size for parcel shipments to individuals by mail or courier). Alternatively, combinations of kit boxes or small (i.e., retail) orders may be shipped on pallets, further improving distribution economy. Kits according to the invention may be sold directly to the consumer, online via the web, or through marine and sporting goods retailers. Various embodiments may be installed professionally or, with relative ease, by the consumer quickly and without special tools.

Figure 8:
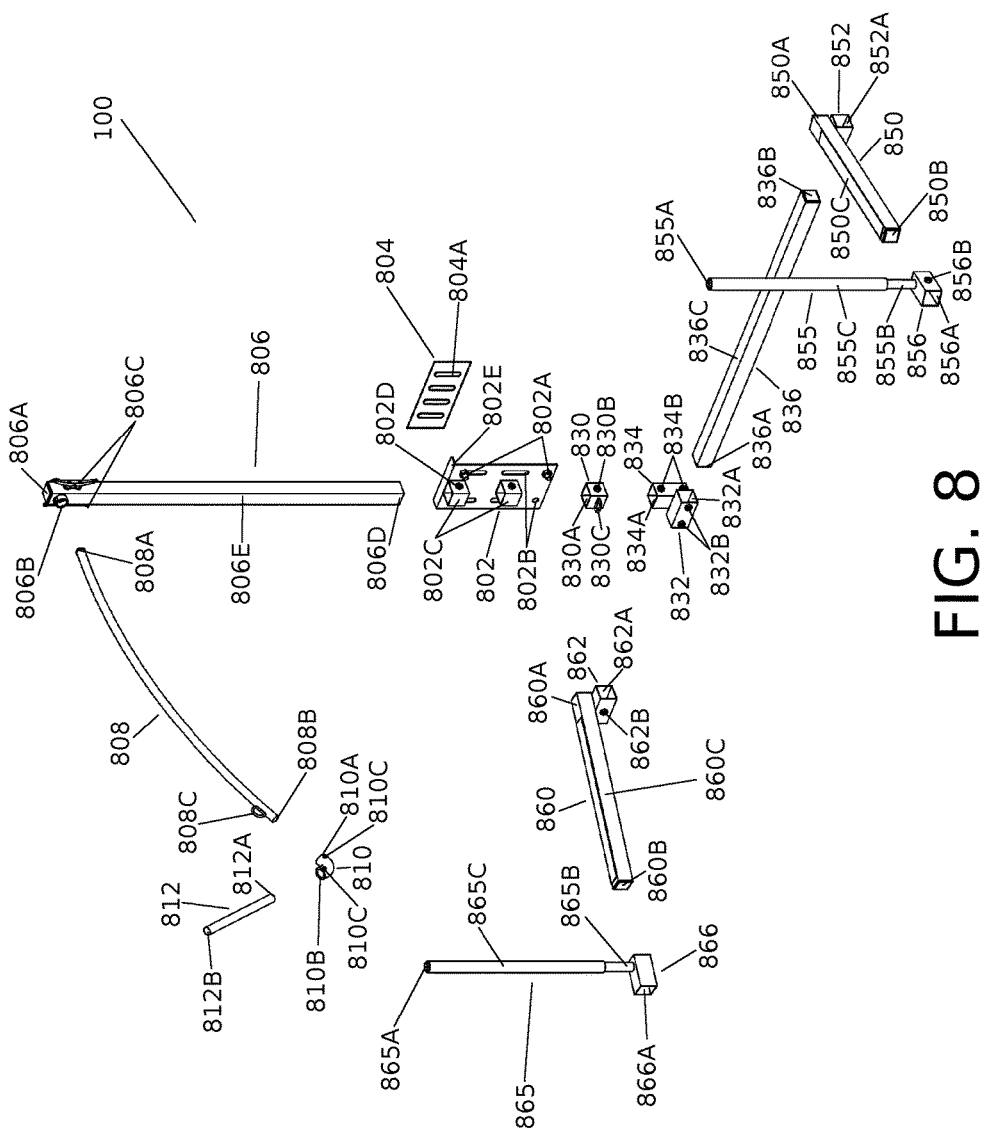
FIG. 8 is a an exploded view of a structure according to at least one embodiment of the invention.

Referring now to the invention in more detail, FIG. 8 provides an exploded view of the various components of a structure 100, in accordance with an embodiment of the invention. In the embodiment of FIG. 8, a bracket 802 is provided. The bracket 802 may be a flat plate that is rigid, resilient (as used herein, the term "resilient" means "not brittle"), and corrosion resistant. Example materials having these properties are described further below. The bracket 802 includes one or more bracket fasteners 802A, which penetrate through one or more bracket holes 802B. The bracket fasteners 802A may comprise mounting bolts in combination with nuts. Optionally, a bracket backplate 804 may be fastened behind the edge of a dock, pier, or other mounting surface, with the bracket fasteners 802A extending through the mounting surface. In alternative embodiments, the bracket fasteners 802A may be screws, nails, rivets, or welded joints. In other alternative embodiments, the bracket 802 may be monolithically incorporated into a molded plastic, cast metal, 3D-printed, or otherwise single-part fabricated component of a pier, dock, or other mounting surface.

Referring still to the embodiment depicted in FIG. 8, the bracket 802 includes a bracket lip 802E, which, as shown, is a monolithically incorporated 90° angle member that is relatively smaller than the primary flat portion of the bracket 802. The bracket lip 802E may extend over the top edge of a dock, pier, or other mounting surface, where it mechanically inhibits the bracket 802 from downward or angular slippage relative to the dock, pier, or other mounting surface. The bracket lip 802E may be produced, in the case of a metal bracket 802, by bending a portion of an initial flat plate by 90°, by welding a separate piece at 90°, or by casting, extruding 3D-printing, or otherwise fabricating a monolithic element.

Referring still to the embodiment depicted in FIG. 8, affixed to the bracket 802 are one or more vertical member receiving structures 802C. The vertical member receiving structures 802C are complementarily shaped to a vertical member 806, described in further detail, below. In the depicted embodiment, the vertical member receiving structures 802C are short square tube segments, two in number, that accommodate a smaller square tube vertical member 806. In alternative embodiments, circular or other cross-sectional shapes are contemplated. The vertical member receiving structures 802C are affixed to the bracket 802 on the face opposite the pier, dock, or other mounting surface. The vertical member receiving structures 802C may be of the same or similar material to the bracket 802, and may be affixed by welds, bolts, rivets, other fasteners, or may be monolithically incorporated into the bracket 802 by molding, casting, 3D-printing, or other method of fabricating a single component.

Referring still to the embodiment depicted in FIG. 8, embedded within the vertical member receiving structures 802C are vertical member receiving structure fasteners 802D. The vertical member receiving structure fasteners 802D, as shown, are embedded bolts, such as Allen bolts, that rotate within a housing within the sidewall of the vertical member receiving structures 802C, to adjustably extend inward toward the interior volume of the vertical member receiving structures 802C, thereby clamping down on any rigid member positioned within the interior volume of the vertical member receiving structures 802C. The vertical member receiving structure fasteners 802D thereby form a slidable-lockable joint with the vertical member 806, which is positioned within the vertical member receiving structures 802C.

In general, as used herein, the term "slidable-lockable joint" refers to any connection between structural members where there exists a first configuration such that a first member passes through a portion of a second member, allowing the second member to be moved translationally and longitudinally relative to the first member, and where there also exists a second configuration where a state is changed such that the first and second member are fixed relative to one another. In the case of the vertical member receiving structure fasteners 802D, the Allen bolts of the embodiment depicted in FIG. 8 may be loosened to achieve the first configuration, where the tips of the Allen bolts do not penetrate substantially into the interior of the vertical member receiving structures 802C, and the vertical member 806 or other rigid member can move freely through the vertical member receiving structures 802C. The Allen bolts similarly may be tightened to achieve the second configuration, where the tips of the Allen bolts do penetrate substantially into the interior of the vertical member receiving structures 802C such that translational movement of the vertical member 806 or other similarly positioned member is frictionally blocked.

In the various depicted embodiments, slidable-lockable joints may be understood to be created by embedded Allen bolts, as shown. In turn, the embedded Allen bolts may be configured so as to not be readily removed through to the exterior of the member in which they are embedded. This may be achieved by placing a stop above the head of the Allen bolt, or by providing sufficient threads within the bolt hole for the Allen bolt that the Allen bolt will require many turns of loosening before being removed from the member in which it is embedded. Other embodiments of slidable lockable joints are contemplated using alternative locking mechanisms. For example, the bolts may vary in the shape of the head (hex bolt, flathead, Phillips, etc.) or in whether they are embedded or simply turned through an embedded nut or a separate nut. In still other alternatives, fastening bolts may be replaced with ratchet clamps, tension bands, or configurations of permanent magnets that can be turned to interfere constructively or destructively to selectively apply a force or not. More generally, the slidable-lockable joints described herein may be achieved by any structures that provide a first configuration where the first member slides through second member, and a second configuration where the first member is fixed relative to the second member.

Referring still to the embodiment depicted in FIG. 8, the vertical member 806 is a vertically oriented member made of a rigid and resilient material, for example square tube steel, as shown. The vertical member 806 is shaped complementarily to the vertical member receiving structures 802C so as to slide therein and form a slidable-lockable joint. The vertical member 806 includes a vertical member top end 806A, a vertical member bottom end 806D, and a vertical member central region 806E. Located at the vertical member top end 806A is an arm receiving structure 806B, which in the depicted embodiment is a through-hole reinforced with a lip on both sides. The cylindrical lip provides load spreading for tubular members inserted through the through-hole, specifically an arm member 808, discussed in further detail below. Tubular members may be secured in the through hole by friction with the lip alone, or by a fastener. Either or both ends of the arm receiving structure 806B may include embedded Allen bolts or other fasteners, such as a twist-lock mechanism or snap-button mechanism. Thus, the arm member 808 inserted into the arm receiving structure 806B may be understood as a slidable-lockable joint, as previously described. It will be understood, however, that, in the depicted embodiment, the arm member 808 is tubular and nonlinear; the resulting rotatability of the arm member 808 relative to the vertical member 806 is a feature whereby the arm member 808 may be place in different configurations for different applications, as further described below. Also affixed to the vertical member top end 806A is a pair of cleats 806C. The pair of cleats 806C are of the kind in common marine use, suitable for small watercraft and correspondingly suitable for tying small gauges of rope. The pair of cleats 806C may be affixed to the vertical member top end 806A as off-the-shelf components via fasteners such as screws, bolts, rivets, or welds. In alternative embodiments, the pair of cleats 806C may be monolithically incorporated into the vertical member 806 by molding, casting, 3D-printing, or other method of fabricating a single component. As shown, the arm receiving structure 806B and the pair of cleats 806C are oriented 90° apart on opposing pairs of faces of the square tube of the vertical member 806. The vertical member 806 is inserted into the vertical member receiving structures 802C such that the arm receiving structure 806B is in line with the bracket 802, and the pair of cleats 806C is offset 90° to the same.

Referring still to the embodiment depicted in FIG. 8, the arm member 808 is a curved tubular element that is rigid and resilient, such as steel tube, pipe, or conduit, any of which may be bent into any desired arc. The arm member 808 includes an arm member first end 808A and an arm member second end 808B. Affixed to the arm member 808 at the arm second end is an arm loop 808C. The arm loop 808C is a rigid and resilient loop that supports a rope being passed through it, but usually not tied off thereon. The arm loop 808C is contemplated to be sufficiently large to permit a rope or line of a particular maximum intended gauge to be easily passed through. The arm loop 808C may be affixed to the arm member second end 808B by bolts, screws, welds, or it may be monolithically incorporated into the arm member 808 by molding, casting, 3D-printing, or other method of fabricating a single component.

Referring still to the embodiment depicted in FIG. 8, an arm elbow member 810 is affixed to the arm member second end 808B. The arm elbow member 810 includes an arm elbow member first end 810A and an arm elbow member second end 810B, each including an embedded arm elbow fastener 810C. The arm elbow fastener 810C may be an embedded Allen bolt or other embedded or nonembedded bolt or screw. The arm elbow fastener 810C is generally effective to secure the arm elbow member 810 over a complementary tubular member inserted into either end thereof. The arm elbow member first end 810A is complementary to and placed over the arm member second end 808B and secured there via the arm elbow fastener 810C. The arm elbow member second end 810B is complementary to and placed over an arm handle member 812. In the depicted embodiment, the arm handle member 812 is a rigid and resilient piece of circular tube steel, pipe, or conduit. As depicted, the arm handle member 812 is relatively shorter than the arm member 808 and not curved. The arm handle member 812 includes an arm handle member first end 812A and an arm handle member second end 812B.

Referring still to the embodiment depicted in FIG. 8, a lower loop member 830 includes a lower loop member tube opening 830A. The lower loop member 830, as depicted, is a short piece of square tube steel with the lower loop member tube opening 830A shaped complementarily to accommodate the vertical member 806. A lower loop member fastener 830B forms a slidable-lockable joint between the lower loop member 830 and the vertical member 806. Affixed to an exterior face of the lower loop member 830 is a lower loop 830C. The lower loop 830C is is a rigid and resilient loop that supports a rope being passed through it, but usually not tied off thereon. The lower loop 830C is contemplated to be sufficiently large to permit a rope or line of a particular maximum intended gauge to be easily passed through. The lower loop 830C may be affixed to the lower loop member 830 by bolts, screws, welds, or it may be monolithically incorporated into the lower loop member 830 by molding, casting, 3D-printing, or other method of fabricating a single component.

Referring still to the embodiment depicted in FIG. 8, a lower joint horizontal member 832 is rigidly affixed at 90° to a lower joint vertical member 834. The lower joint horizontal member 832 includes a lower joint horizontal member tube opening 832A with a lower joint horizontal member fastener 832B (e.g., an embedded Allen bolt, as described above), and the lower joint vertical member 834 includes a lower joint vertical member tube opening 834A with a lower joint vertical member fastener 834B (e.g., an embedded Allen bolt, as previously described). The lower joint horizontal member 832 and the lower joint vertical member 834, as depicted, are short pieces of square tube steel with the lower joint horizontal member tube opening 832A shaped complementarily to accommodate a horizontal member 836, further described below, and the lower joint vertical member tube opening 834A shaped to accommodate the vertical member 806. The lower joint horizontal member fastener 832B forms a slidable-lockable joint between the lower joint horizontal member 832 and the horizontal member 836, while the lower joint vertical member fastener 834B forms a slidable-lockable joint between the lower joint vertical member 834 and the vertical member 806.

The lower joint horizontal member 832 and the lower joint vertical member 834, in the depicted embodiment, are affixed to one another by welds, bolts, rivets, screws, or other fasteners, or are monolithically produced together via molding, casting, 3D-printing, or otherwise fabricating a single component. In the depicted embodiment, the lower joint horizontal member 832 and the lower joint vertical member 834 are oriented 90° to one another with the lower joint vertical member 834 positioned centrally on the lower joint horizontal member 832, and the lower joint horizontal member 832 is positioned at the bottom of the lower joint vertical member 834, although other configurations are contemplated. In embodiments that include the lower joint horizontal member 832 and lower joint vertical member 834, as shown, the horizontal member 836 may be understood to be slidably-lockably affixed to the vertical member 806, via the slidable-lockable action of the lower joint vertical member 834, Referring still to the embodiment depicted in FIG. 8, the horizontal member 836 (or, horizontal spine) is an elongated piece of square tubed steel shaped contemplentarily to the lower joint horizontal member tube opening 832A. The horizontal member 836 includes a horizontal member first end 836A, a horizontal member second end 836B, and a horizontal member central region 836C.

Referring still to the embodiment depicted in FIG. 8, a first bumper arm member 850 and a second bumper arm member 860 are both elongated pieces of square tube steel, as shown. The first bumper arm member 850 includes a first bumper arm member first end 850A, a first bumper arm member second end 850B, and a first bumper arm member central region 850C, and the second bumper arm member 860 includes a second bumper arm member first end 860A, a second bumper arm member second end 860B, and second bumper arm member central region 860C. The first bumper arm member 850 is attached, at the first bumper arm member first end 850A to a first bumper arm slide member 852, which includes a first bumper arm slide member tube opening 852A and a first bumper arm slide member fastener 852B (e.g., embedded Allen bolt or alternatives, as described above). It is noted that the first bumper arm slide member fastener 852B is obstructed in the view of FIG. 8, but is visible and called out in FIG. 7. Similarly, the second bumper arm member 860 is attached, at the second bumper arm member first end 860A to a second bumper arm slide member 862, which includes a second bumper arm slide member tube opening 862A and a second bumper arm slide member fastener 862B (e.g., embedded Allen bolt or alternatives, as described above).

Referring still to the embodiment of FIG. 8, the first bumper arm slide member 852, as shown, is a piece of square tube steel sized and shaped such that the first bumper arm slide member tube opening 852A accommodates the horizontal member 836 to form a slidable-lockable joint between the first bumper arm slide member 852 and the horizontal member 836 using the first bumper arm slide member fastener 852B, and thus the first bumper arm member 850 may be understood as slidably-lockably affixed to the horizontal member 836. Similarly, the second bumper arm slide member 862, as shown, is a pieced of square tube steel sized and shaped such that the second bumper arm slide member tube opening 862A accommodates the horizontal member 836 to form a slidable-lockable joint between the second bumper arm slide member 862 and the horizontal member 836 using the second bumper arm slide member fastener 862B, and thus the second bumper arm member 860 may be understood as slidably-lockably affixed to the horizontal member 836. As shown, the first bumper arm member 850 and the first bumper arm slide member 852 are positioned at an angle relative to one another of about 115°, which angle may be fixed or adjustable. The second bumper arm member 860 and the second bumper arm slide member 862 are similarly situated. To achieve a fixed angle, the first bumper arm member first end 850A (or the second bumper arm member first end 860A) may be fixedly attached via bolts, welds, rivets, or other rigid fasteners to the first bumper arm slide member 852 (or the second bumper arm slide member 862), or the two may be monolithically incorporated via molding, casting, 3D-printing, or other method of single-part fabrication. Alternatively, the first bumper arm member first end 850A (or the second bumper arm member first end 860A) may be rotatably attached to the first bumper arm slide member 852 (or the second bumper arm slide member 862), for example via a bolt that, when loosened, permits free rotation, but frictionally prevents rotation when tightened. This configuration may be understood as a "rotatable-lockable joint". As used herein, the term "rotatable-lockable joint" refers to any joint between a first structural member and a second structural member where a first configuration exists that allows the first structural member to rotate relative to the second structural member, but where a second configuration also exists in which such rotation is prevented. Alternative means of achieving rotatable-lockable joints include clamps, cinches, tension bands, slide lock mechanisms, and tension button lock mechanisms. In various configurations, the first bumper arm member 850 and the second bumper arm member 860 may be inverted on the horizontal member 836 to achieve a difference in height relative to the horizontal member 836, as needed, depending on the water level and type of watercraft. Additionally, the the first bumper arm member 850 and the second bumper arm member 860 may be swapped to achieve an inward angle, which may support right-angle docking of a slender watercraft in the water, such as a canoe or a scull.

Referring still to the embodiment of FIG. 8, a first bumper member 855 includes a first bumper member top end 855A and first bumper member bottom end 855B. Similarly, a second bumper member 865 includes a second bumper member top end 865A and a second bumper member bottom end 865B. The first bumper member 855 and the second bumper member 865 may be elongated pieces of circular tube steel, pipe, or conduit. A first bumper shock absorbing layer 855C surrounds the first bumper member 855, and a similar second bumper shock absorbing layer 865C surrounds the second bumper member 865. The first bumper shock absorbing layer 855C and the second bumper shock absorbing layer 865C may be made of various plastics, rubbers, resins, etc., with the intended function of the material to prevent surface damage and scratching to watercraft moored against the first bumper member 855 and/or the second bumper member 865. In at least one embodiment, the first bumper shock absorbing layer 855C and the second bumper shock absorbing layer 865C are made of ethylene propylene diene monomer (EPDM).

The first bumper member 855 is affixed at the first bumper member bottom end 855B to a first bumper slide member 856. Similarly, the second bumper member 865 is affixed at the second bumper member bottom end 865B to a second bumper slide member 866. The first bumper slide member 856 and second bumper slide member 866, as depicted, are short lengths of square tube steel, which respectively include a first bumper slide member tube opening 856A and a second bumper slide member tube opening 866A, and, also respectively, a first bumper slide member fastener 856B and a second bumper slide member fastener 866B (the second bumper slide member fastener 866B is obstructed in FIG. 8, but is visible and called out in FIG. 5). The first bumper slide member fastener 856B and the second bumper slide member fastener 866B are embedded Allen bolts or alternatives, as described in detail above. The first bumper slide member tube opening 856A is sized and shaped to accommodate the first bumper arm member 850 via the first bumper arm member second end 850B, so as to create a slidable-lockable joint between the first bumper arm member 850 and the first bumper slide member 856 via the first bumper slide member fastener 856B, and thus the first bumper 1355 may be understood to be slidably-lockably affixed to the first bumper arm member 850. Similarly, the second bumper slide member tube opening 866A is sized and shaped to accommodate the second bumper arm member 860 via the second bumper arm member second end 860B, so as to create a slidable-lockable joint between the second bumper arm member 860 and the second bumper slide member 866 via the second bumper slide member fastener 866B, and thus the second bumper 1365 may be understood to be slidably-lockably affixed to the second bumper arm member 860. As a result of the slidable-lockable action between (i) the horizontal member 836 and the first bumper arm slide member 852 and second bumper arm slide member 862; and (ii) the first bumper arm member 850 and the first bumper slide member 856, on the one hand, and the second bumper arm member 860 and the second bumper slide member 866, on the other, both the first bumper 1355 and the second bumper member 865 may be understood to be adjustable both side-to-side and front-to-back.

Referring now to FIG. 9, FIG. 9 provides an exploded view of components for a structure 100 similar to that of FIG. 8, but with a water level adjustment extension installed. Embodiments that include a water level adjustment extension may, but need not necessarily, benefit from various advantages, specifically an additional drop leg with top step provides additional depth for higher piers or greater water level fluctuations. In embodiments including a water level adjustment extension, a primary extension slide member 906 is affixed to and offset from a secondary extension slide member 908. The offset, as shown, has the primary extension slide member 906 and the secondary extension slide member 908 about parallel, affixed on side faces, and positioned such that the primary extension slide member 906 is, in the orientation shown, vertically higher than the secondary extension fasteners 908B. The primary extension slide member 906 may be affixed to the secondary extension slide member 908 by welds, bolts, rivets, or other fasteners, or the two components may be monolithically integrated by casting, molding, 3D-printing, or other method of fabricating a single component. In the depicted embodiment, the primary extension slide member 906 is a piece of square tube steel sized and shaped complementarily to the vertical member 806 such that the vertical member bottom end 806D passes through a primary extension slide tube opening 906A, where it can be selectively fastened by one or more primary extension fasteners 906B (two are shown), which may be embedded Allen bolts or other fasteners, as described above, to form a slidable-lockable joint between the vertical member 806 and the primary extension slide member 906. In the depicted embodiment, the secondary extension slide member 908 is a piece of square tube steel sized and shaped complementarily to a secondary vertical member 902, described in further detail below, such that the secondary vertical member 902 passes through a secondary extension slide tube opening 908A, where it can be selectively fastened by one or more secondary extension fasteners 908B (two are shown), which may be embedded Allen bolts or other fasteners, as described above, to form a slidable-lockable joint between the secondary vertical member 902 and the secondary extension slide member 908. In various contemplated embodiments, either the primary extension fasteners 906B or the secondary extension fasteners 908B may be left in a slidable configuration to allow the secondary vertical member 902 to move freely longitudinally relative to the vertical member 806. In such configurations, the vertical member 806 may be understood to be a primary vertical member slidably affixed to the secondary vertical member 902.

Referring still to the embodiment depicted in FIG. 9, the secondary vertical member 902, as depicted, is an elongated piece of square tube steel sized and shaped to fit complementarily within any of the secondary extension slide tube opening 908A of the secondary extension slide member 908, the lower loop member tube opening 830A of the lower loop member 830, and the lower joint vertical member tube opening 834A of the lower joint vertical member 834. In the configuration of the depicted embodiment, the lower loop member 830 and the lower joint vertical member 834 are not affixed to the vertical member 806, but are affixed to the secondary vertical member 902 instead. The secondary vertical member 902, as depicted includes a secondary vertical member top end 902A, a secondary vertical member bottom end 902B, and a secondary vertical member central region 902C. Affixed to the secondary vertical member top end 902A, in a T-configuration to the secondary vertical member 902 is a secondary vertical member stop 904. The secondary vertical member stop 904, as depicted, is a piece of square tube steel that is short relative to the secondary vertical member 902, does not obstruct the secondary vertical member 902 sliding against the primary extension slide member 906 or vertical member 806, and operates to prevent the secondary vertical member 902 from falling through the secondary extension slide member 908. The secondary vertical member stop 904 may be affixed to the secondary vertical member top end 902A by welds, bolds, rivets, or other fasteners, or the two components may be monolithically incorporated into a single piece by molding, casting 3D-printing, or other single-part fabrication method. Affixed to the secondary vertical member stop 904 on the face opposite the vertical member 806 is a secondary vertical member cleat 904A. The secondary vertical member cleat 904A may be affixed to the secondary vertical member stop 904 by welds, bolds, rivets, or other fasteners, or the two components may be monolithically incorporated into a single piece by molding, casting, 3D-printing, or other single-part fabrication method. The secondary vertical member cleat 904A operates to provide a rope attachment point that slides with the secondary vertical member 902 relative to the vertical member 806, which is rigidly affixed to the pair of cleats 806C, which provide an attachment point that is fixed relative to the dock, pier, or other mounting surface.

Figure 18A:
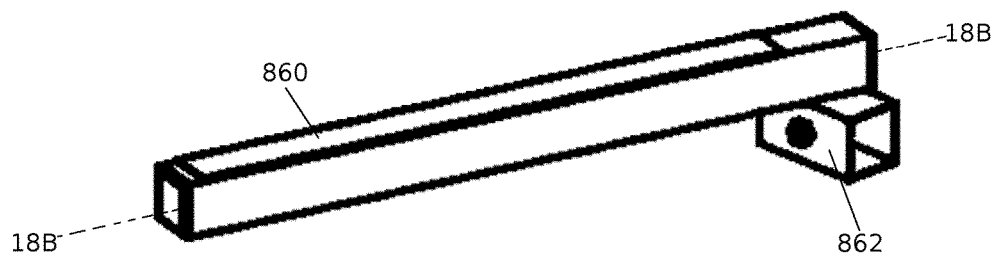
FIG. 18A is a detail view of a sealed structural component, in accordance with at least one embodiment of the invention, displaying the sectional line of FIG. 18B.
Figure 18B:
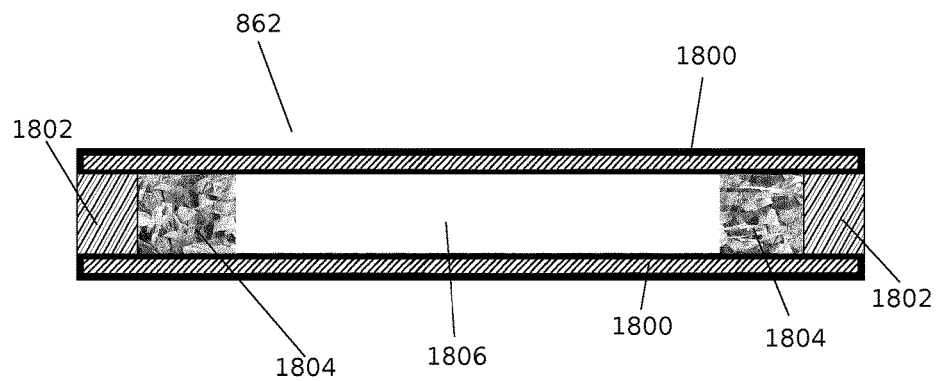
FIG. 18B is a sectional view of the sealed structural component of FIG. 18A, in accordance with at least one embodiment of the invention.

Referring now to FIGS. 18A and 18B, various components of the above-described embodiments may be made floatable and/or water resistant by sealing the ends. FIG. 18A is a close up of the second bumper arm member 860, which may be taken as exemplary of other components that may be sealed, specifically the first bumper arm member 850, the first bumper member 855, the second bumper member 865, the horizontal member 836, the vertical member 806, the secondary vertical member 902, the secondary vertical member stop 904, the arm member 808, and the arm handle member 812. The components that may be sealed generally include any component made of tubular material that does not receive a smaller component inside its annular opening. FIG. 18A shows the section line of FIG. 18B, thus FIG. 18B shows a sectional view of the second bumper arm member 860. As depicted, the ends of the sealed member are filled with expanding foam sealant 1802. In alternative embodiments, resins, rubbers, plastics, corks, or other sealing materials may be inserted into the sealing member ends. Since filling the entire member with sealing material is both unnecessary and costly, the central region may be left filled with air or, as depicted, a filler material 1804, such crumpled or shredded newsprint. Other filler materials can include foam packing material, wood chips, bubble packaging, etc. The filler material 1804 need not fill the entire filled member, but instead, an air gap 1806 may be left, to maximize buoyancy. The filler material 1804 generally operates to provide backing to the foam sealant 1802, allowing it to set properly while using less sealant. The result of sealing components as described is that the sealed components can float, which eases installation of the structure 100, and also allows the lower structural elements, specifically the secondary vertical member 902, horizontal member 836, first bumper arm member 850, second bumper arm member 860, first bumper member 855, and second bumper member 865 to slide vertically upward when urged in that direction by the buoyant force of rising water and to fall when the buoyant force is absent due to falling water level.

Figure 6:
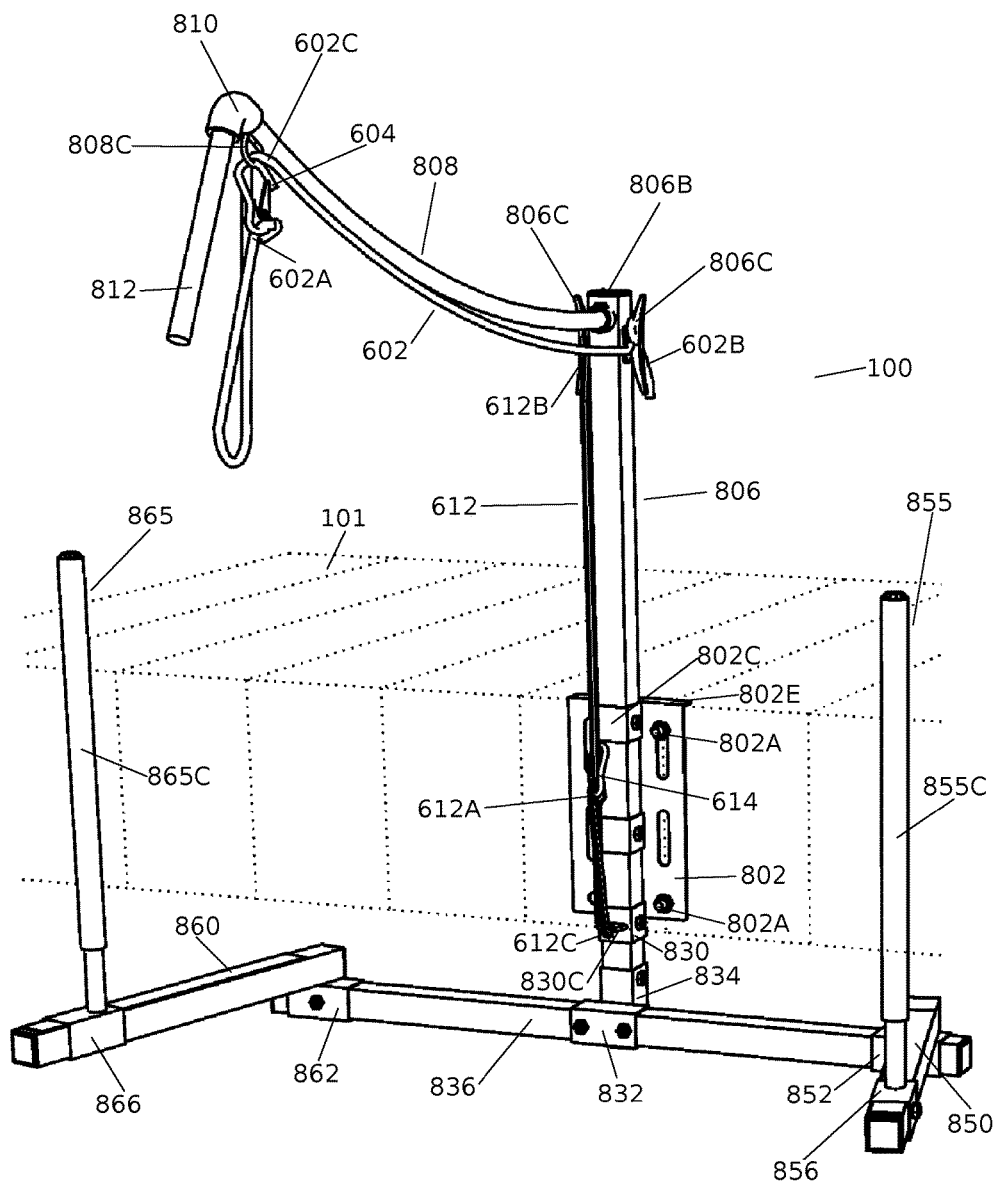
FIG. 6 is front-right perspective view of a structure according to at least one embodiment of the invention, in isolation.

Referring now to FIG. 6, FIG. 6 depicts an embodiment of the invention similar to that of FIG. 8 in an assembled configuration with exemplary rope and/or tether lines installed. In the embodiment depicted in FIG. 6, the structure 100 is affixed to a dock 101 via the bracket fasteners 802A. The dock 101 may be made of wood, metal, composite, plastic, or other materials, and may be fixed or floating. Where the dock 101, pier, or other structure lacks a solid sidewall, as in a truss pier or pen web pier, the bracket backplate 804 may be applied to secure the bracket 802 to whichever structure(s) may be present on the side of the dock 101. In the depicted embodiment, the structure 100 is assembled without the water level adjustment extension components such that the lower loop member 830 and the lower joint vertical member 834 are in slidable-lockable joints with the vertical member 806 and not with the secondary vertical member 902, with the remaining components assembled similarly to discussed above for FIG. 8. It will be noted that FIG. 6 depicts the arm member 808 configured with the arm loop 808C oriented downward and the arm elbow member 810 and arm handle member 812 configured to be oriented downward. More generally, the orientation of the arm handle member 812, arm elbow member 810, and arm member 808, as well as the extent to which the arm member 808 is passed through the vertical member receiving structures 802C may be adjusted according to user preference for any given configuration or class of configurations.

Referring still to the embodiment depicted in FIG. 6, a top rope 602 includes a top rope first end 602A, a top rope second end 602B, and a top rope central region 602C. In the depicted embodiment, the top rope second end 602B is secured to one of the pair of cleats 806C using a cleat hitch or other appropriate knot. The top rope central region 602C is passed through the arm loop 808C. The top rope first end 602A terminates in a top rope clip 604, which is depicted clipped to the arm loop 808C in a storage configuration. In the below-described docking configurations, the top rope 602 may be understood as generally a rope that uses the arm loop 808C to reach out and above a parked watercraft.

Referring still to the embodiment depicted in FIG. 6, a bottom rope 612 includes a bottom rope first end 612A, a bottom rope second end 612B, and a bottom rope central region 612C. In the depicted embodiment, the bottom rope second end 612B is secured to one of the pair of cleats 806C using a cleat hitch or other appropriate knot. The bottom rope central region 612C is passed through the lower loop 830C. The bottom rope first end 612A terminates in a bottom rope clip 614, which is depicted clipped back to the bottom rope 612 in a storage configuration (in the depicted configuration, the bottom rope clip 614 is expected to fall to the lower loop 830C). In the below-described docking configurations, the bottom rope 612 may be understood as generally a rope that uses the lower loop 830C to reach the centered front region of a parked watercraft, as determined in relation to the structure 100.

Figure 7:
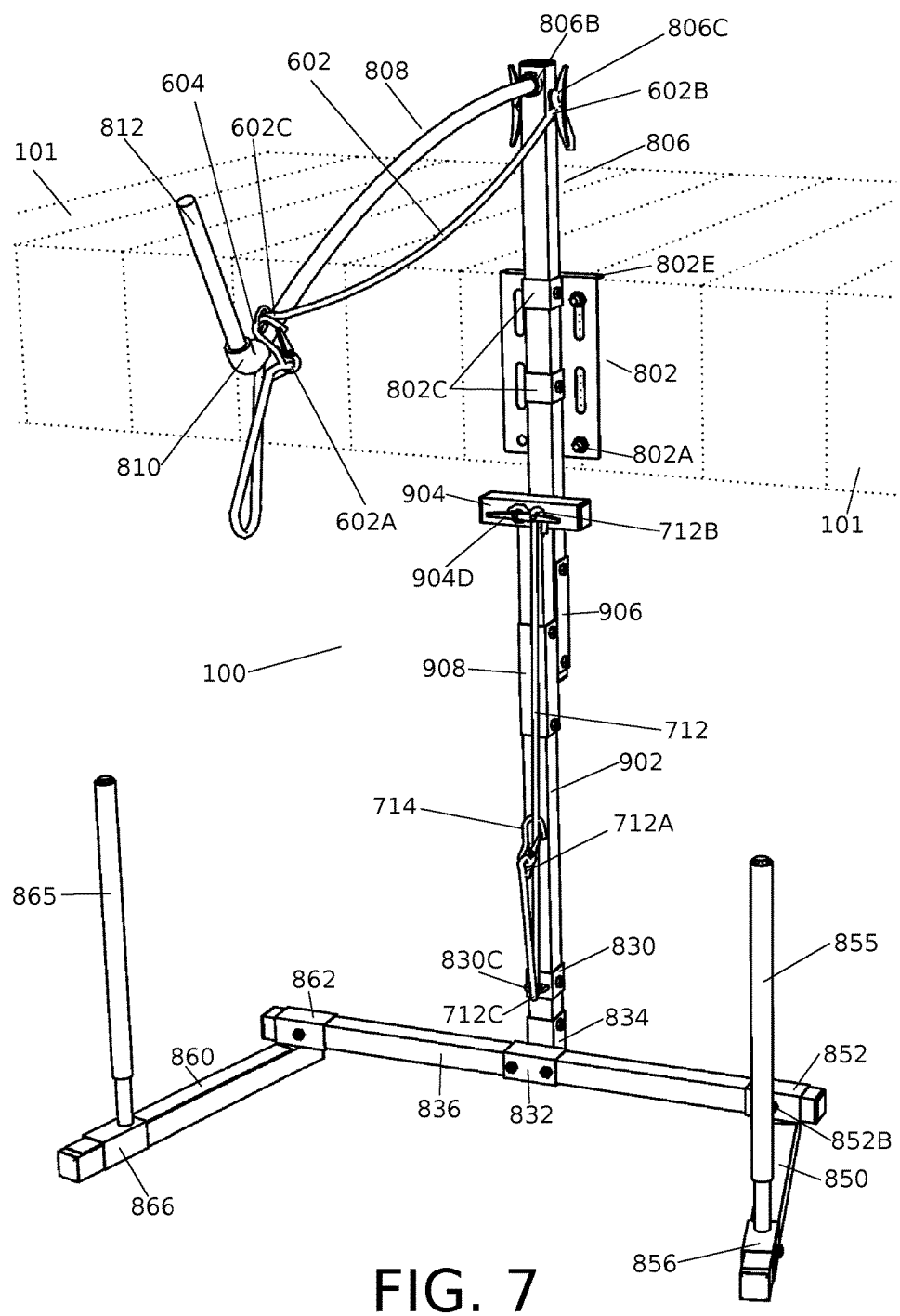
FIG. 7 is a front-right perspective view of a structure according to at least one embodiment of the invention, in isolation with a water level adjustment extension installed.

Referring now to FIG. 7, FIG. 7 depicts an embodiment of the structure 100 with a water level adjustment extension installed, similarly to the embodiment of FIG. 9. In the embodiment depicted in FIG. 7, the bracket 802 is affixed to the dock 101, as described for FIG. 6. The vertical member bottom end 806D is in a slidable-lockable joint with the primary extension slide member 906 and not the lower loop member 830 or the lower joint vertical member 834. The secondary vertical member central region 902C is in a slidable-lockable joint with the secondary extension slide member 908, and the secondary vertical member bottom end 902B is in slidable-lockable joints with the lower loop member 830 and the lower joint vertical member 834. The remaining rigid components are configured similarly to FIG. 9 and the top rope 602 configured similarly to FIG. 6. In the embodiment depicted in FIG. 7, the bottom rope second end 612B is not hitched to one of the pair of cleats 806C, but is hitched to the secondary vertical member cleat 904A, which allows the attachment point to move vertically with the secondary vertical member 902.

Figure 10:
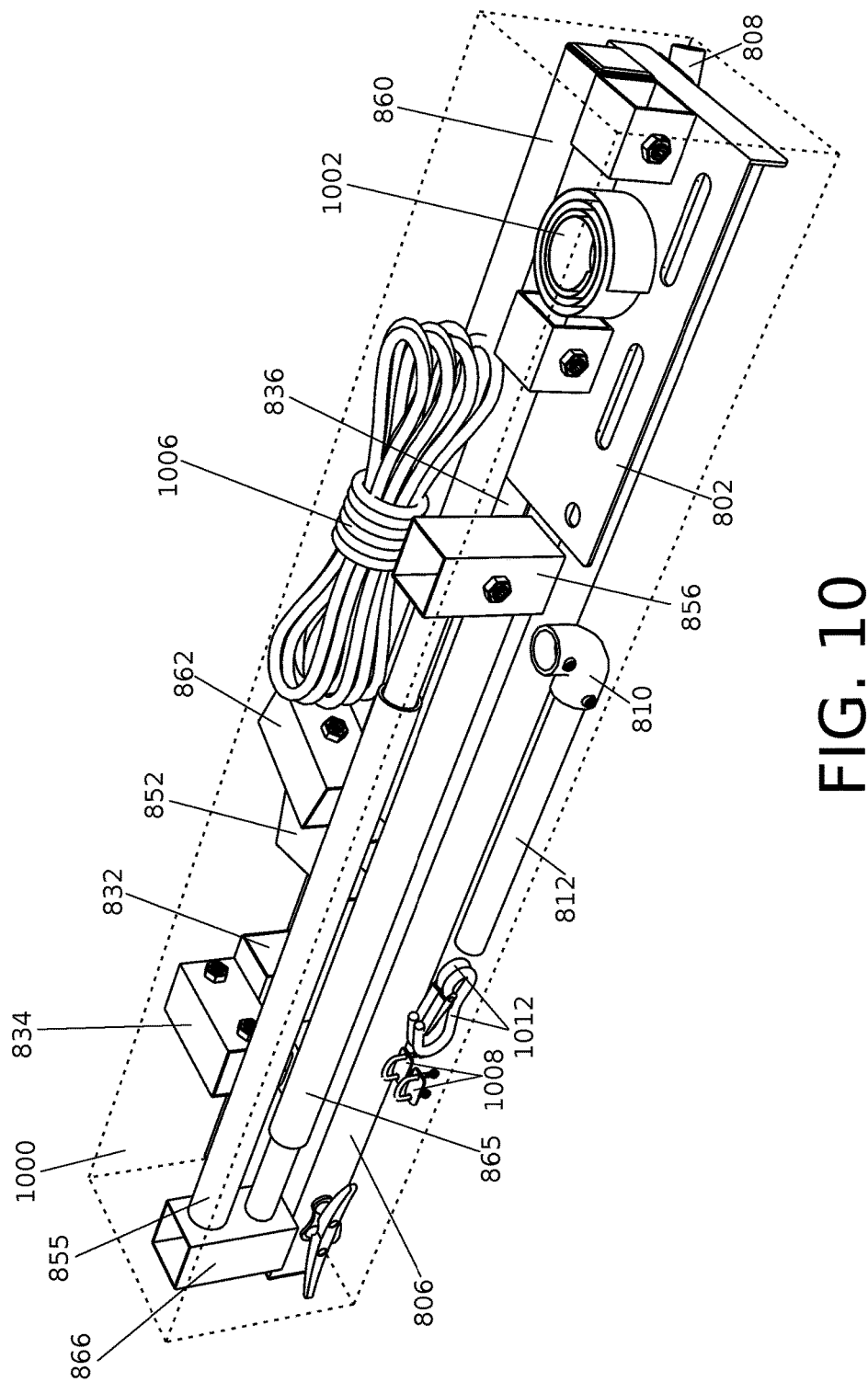
FIG. 10 is an elevated right perspective view of a kit for a structure according to at least one embodiment of the invention, configured to fit inside an oblong container.
Figure 11:
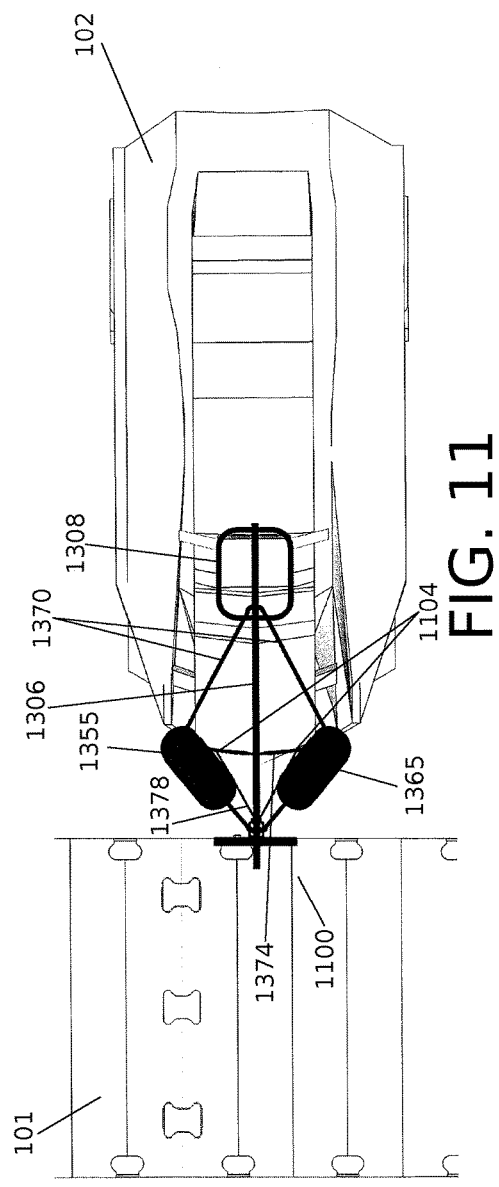
FIG. 11 is a plan view of a structure according to at least one embodiment of the invention, configured for a powered personal watercraft.
Figure 12:
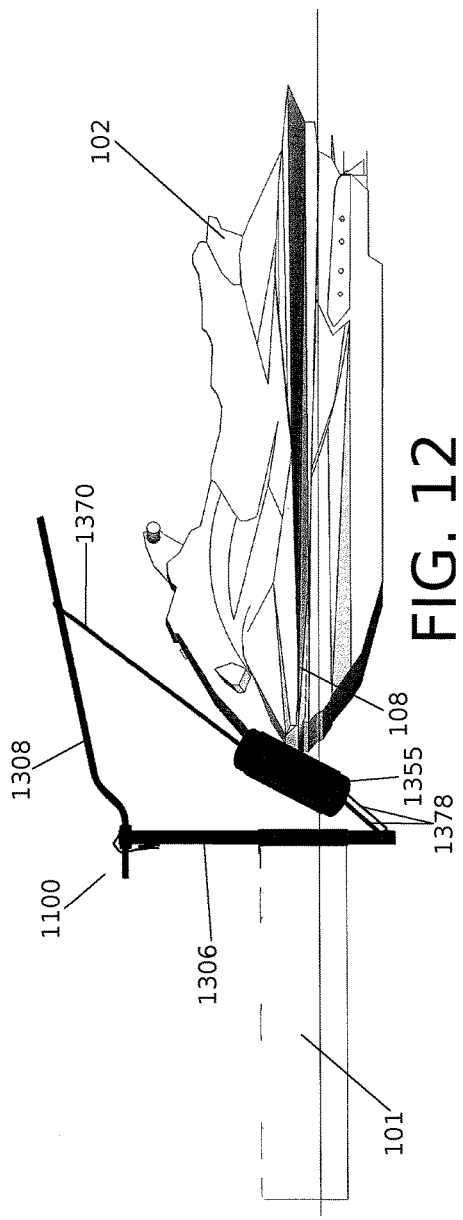
FIG. 12 is a profile view of a structure according to at least one embodiment of the invention, configured for a powered personal watercraft.

Referring now to FIG. 10, FIG. 10 depicts an exemplary kit for various components of a structure 100 arranged in a kit box 1000. The depicted embodiment shows various components, as shown in FIG. 8, in an exemplary boxed configuration. While not all of the above-described components are shown, various embodiments of the kit may include various components described herein, and such a kit may be packaged in multiple boxes or in non-box packaging. Also, it will be understood that the depicted configuration is exemplary only, and that in other embodiments, the components may be packed in other configurations. In addition to the manufactured components, extra installation supplies and parts may be provided. While FIG. 10 shows several additional supplies and/or parts, the inclusion of such supplies and parts here is intended by way of example, rather than by way of limitation, and no particular additional kit element is necessarily required for the practice of the invention.

Referring still to the kit of FIG. 10, the additional components include one or more rolls of adhesive grip material 1002, one or more coils of rope 1006, one or more U-bolts 1008, and one or more clip connectors 1012. The adhesive grip material 1002 may be applied to the dock, watercraft, or structural components that contact the watercraft, according to user preference. In particular the adhesive grip material 1002 may be applied in locations where users are expected to step. The rope 1006 may be cut and affixed to the clip connectors 1012 to form the top rope 602 and bottom rope 612. The U-bolts 1008 may be affixed to watercraft and other elements that loops, cleats, or other rope attachment points in a desired location. Other connectors, such as D-ring connectors, may be substituted for the U-bolts 1008. In addition to the kit of FIG. 10, a second kit may include the water level adjustment extension components, making the water level adjustment extension an optional add-on that can be shipped and warehoused separately from the kit box 1000.

Referring now to FIG. 1, FIG. 1 depicts a docking configuration for a powered personal watercraft in the absence of a water level adjustment extension. The structure 100, as depicted, is similar to the configuration of FIG. 6. The configuration of FIG. 1 may be understood as bow to dock. In the depicted embodiment, a powered personal watercraft 102 is parked perpendicular to the dock 101 using the structure 100. The powered personal watercraft 102 includes a powered personal watercraft handlebar 104, a powered personal watercraft bow loop 106, and a powered personal watercraft rim 108. The powered personal watercraft handlebar 104 may be understood as the gross structure of the steering column about which a rope may be looped, regardless of the detailed shape of the particular model or features of the powered personal watercraft 102. The powered personal watercraft bow loop 106 may be understood as any forward attachment point on the powered personal watercraft 102, whether provided by the watercraft manufacture or installed by the user on an aftermarket basis. The powered personal watercraft rim 108 may be understood as that portion of the powered personal watercraft 102 that contacts with other objects in the environment, such as docks and piers, other watercraft, and the first bumper member 855 or second bumper member 865.

Referring still to the configuration of FIG. 1, in the depicted configuration, the top rope 602 is configured such that the top rope second end 602B is hitched to one of the pair of cleats 806C, the top rope central region 602C is passed through the arm loop 808C, and the top rope first end 602A is looped around the powered personal watercraft handlebar 104 with the top rope clip 604 clipped back to the top rope 602 to create the loop, thereby securing the powered personal watercraft 102 via the powered personal watercraft handlebar 104. The bottom rope 612 is configured such that the bottom rope second end 612B is hitched to one of the pair of cleats 806C, the bottom rope central region 612C is passed through the lower loop 830C, and the bottom rope clip 614 is clipped to the powered personal watercraft bow loop 106.

Referring still to the configuration of FIG. 1, the configuration of FIG. 1 is exemplary of various methods of installing a structure 100 and of parking and loading of the powered personal watercraft 102. The method of installing the configuration of FIG. 1 includes, given the above-described components, of FIG. 8, for example in a kit according to FIG. 10, in no preferred order: (i) affixing the bracket 802 to the dock 101, using a choice of bracket fasteners 802A appropriate to the material and style of the dock 101 and using the bracket backplate 804, if needed or desired; (ii) passing the horizontal member 836 through the lower joint horizontal member 832 such that the lower joint horizontal member 832 is centered on the horizontal member central region 836C and tightening the lower joint horizontal member fastener 832B; (iii) passing the horizontal member first end 836A through the second bumper arm slide member 862 and the horizontal member second end 836B through the first bumper arm slide member 852, and passing the first bumper arm member 850 through the first bumper slide member 856 and the second bumper arm member 860 through the second bumper arm slide member 862, while adjusting the left-right and front back position of the first bumper member 855 and the second bumper member 865 to a position that cradles the bow of the powered personal watercraft 102, as shown, and tightening the aforementioned components with their respective fasteners; (iv) passing the vertical member bottom end 806D through the vertical member receiving structures 802C, the lower loop member 830, and the lower joint vertical member 834 and tightening the respective fasteners such that the lower joint horizontal member 832 is at the water level or a desired distance above or below water level; (v) passing the arm member 808 through the arm receiving structure 806B such that the arm member 808 curves upward with the arm loop 808C oriented downward and that the arm member 808 is about fully extended outward from the vertical member 806; (vi) affixing the arm handle member 812 in a downward orientation to the arm member second end 808B using the arm elbow member 810; (vii) hitching the top rope second end 602B to one of the pair of cleats 806C and passing the top rope 602 through the arm loop 808C; (viii) hitching the bottom rope second end 612B to one of the pair of cleats 806C, and passing the bottom rope 612 through the lower loop 830C. Optional additional installation steps include installing adhesive grip material 1002 on any of the dock 101, the first bumper member 855, the second bumper member 865, and the powered personal watercraft rim 108. Optional steps further include installing a powered personal watercraft bow loop 106 using one of the U-bolts 1008. A method for uninstallation may include detaching the various components from their described positions, which is made simple by the use of slidable-lockable joints. For such a method, the bracket 802 may be left on the dock 101 or removed. Additionally, the entire structure 100 may be left up year round or removed seasonally.

Referring still to the configuration of FIG. 1, a method of parking the powered personal watercraft 102 includes: (i) taxiing the powered personal watercraft 102 to the parking position, bow in towards the structure 100 with the powered personal watercraft rim 108 in contact with the first bumper member 855 and the second bumper member 865; (ii) clipping the top rope first end 602A to itself using the top rope clip 604 to form a loop around the powered personal watercraft handlebar 104; clipping the bottom rope clip 614 to the powered personal watercraft bow loop 106; and taking up slack in the top rope 602 and bottom rope 612 and securing any slack using the pair of cleats 806C. Unparking the powered personal watercraft 102 may be achieved by detaching the bottom rope clip 614 from the powered personal watercraft bow loop 106; detaching the top rope clip 604 from the top rope 602 to release the loop around the powered personal watercraft handlebar 104; stowing the top rope 602 and bottom rope 612 in a storage configuration; and pushing off the powered personal watercraft 102 from the structure 100.

Referring still to the configuration of FIG. 1, a method of boarding the powered personal watercraft 102 include, for a user standing adjacent to the structure 100: (i) grasping the arm handle member 812 using the hand nearer the structure 100; (ii) stepping onto the powered personal watercraft 102 using the foot nearer the structure 100; (iii) lifting the foot farther from the structure 100 while pivoting the foot nearer the structure 100 and kicking over the seat of the powered personal watercraft 102 to straddle the powered personal watercraft 102; releasing the arm handle member 812; and unparking and pushing off from the structure 100. Unboarding the powered personal watercraft 102 may be achieved by reversing the above-described boarding method. Thus, the arm member 808 may be understood to facilitate boarding and unboarding of the kayak 202.

Referring now to the configuration depicted in FIG. 5, FIG. 5 presents a configuration similar to FIG. 1, but where a water level adjustment extension is present. The structure 100, as depicted, is similar to the configuration of FIG. 7. In the depicted configuration, the bottom rope 612 is configured such that the bottom rope second end 612B is hitched to the pair of cleats 806C, the bottom rope central region 612C is passed through the lower loop 830C, and the bottom rope clip 614 is clipped to the powered personal watercraft bow loop 106. Additionally, the arm member 808 is configured with its arc pointing down and the arm handle member 812 also pointing down, in accordance with the water level being often lower, relative to the dock 101, than in the configuration of FIG. 1.

Referring still to the configuration of FIG. 5, the method of installation is similar to that of the configuration of FIG. 1, except that in step (iv), the vertical member bottom end 806D is not passed through the lower loop member 830 and the lower joint vertical member 834, but instead through the primary extension slide member 906, which is tightened to the vertical member 806, and that the secondary vertical member 902 is passed through the secondary extension slide member 908, which is left untightened, and the through the lower loop member 830 and the lower joint vertical member 834, which are tightened. Additionally, at step (v), the arm member 808 is affixed to arc downward and, at step (vi), the arm handle member 812 is directed downward. Additionally, in step (viii), the bottom rope second end 612B is hitched not to one of the pair of cleats 806C, but to the secondary vertical member cleat 904A. Methods for parking and boarding (and the reverse of each) in the configuration of FIG. 5 are similar to those of FIG. 1.

Figure 4:
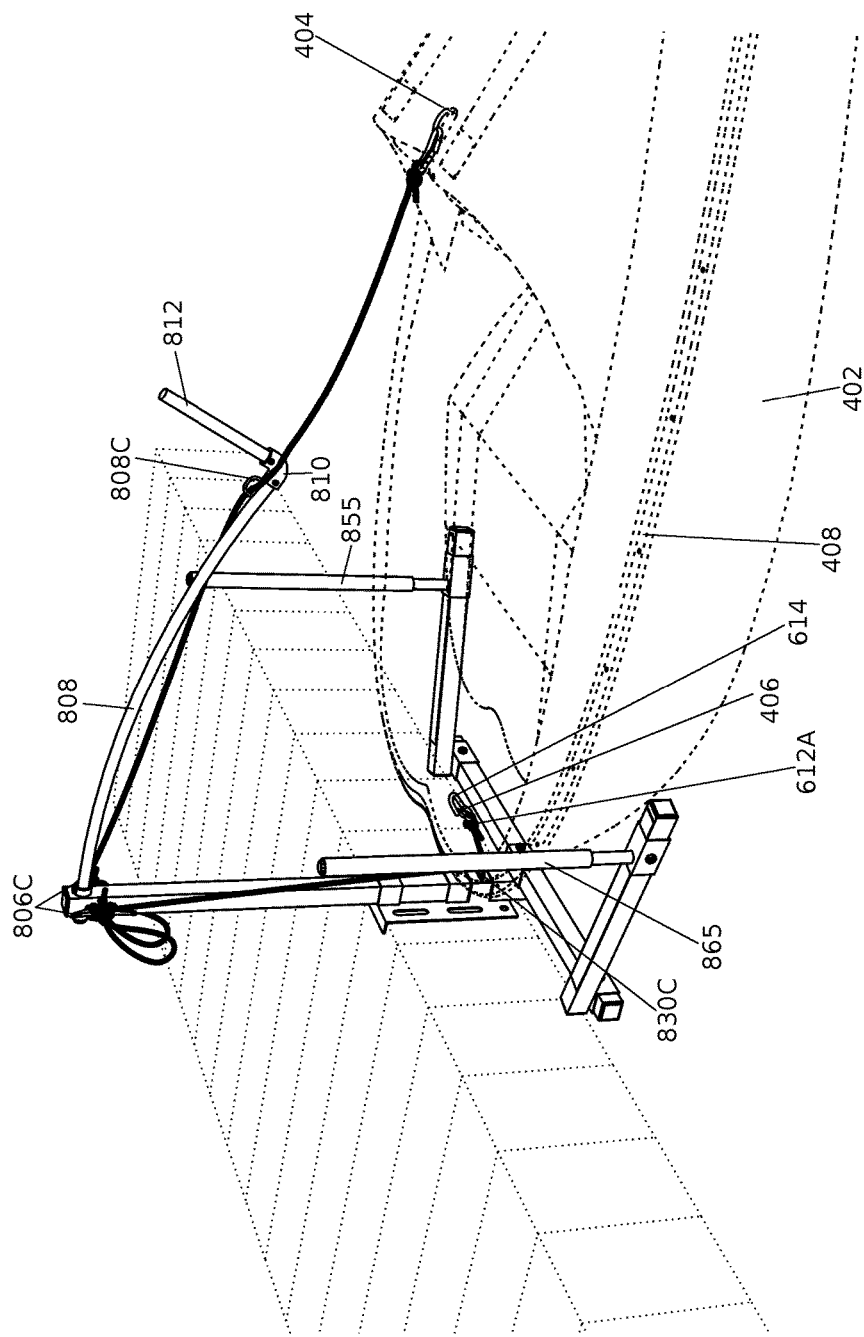
FIG. 4 is a left-front perspective view of a structure according to at least one embodiment of the invention in a configuration for docking a personal boat bow-to-dock.
Figure 5:
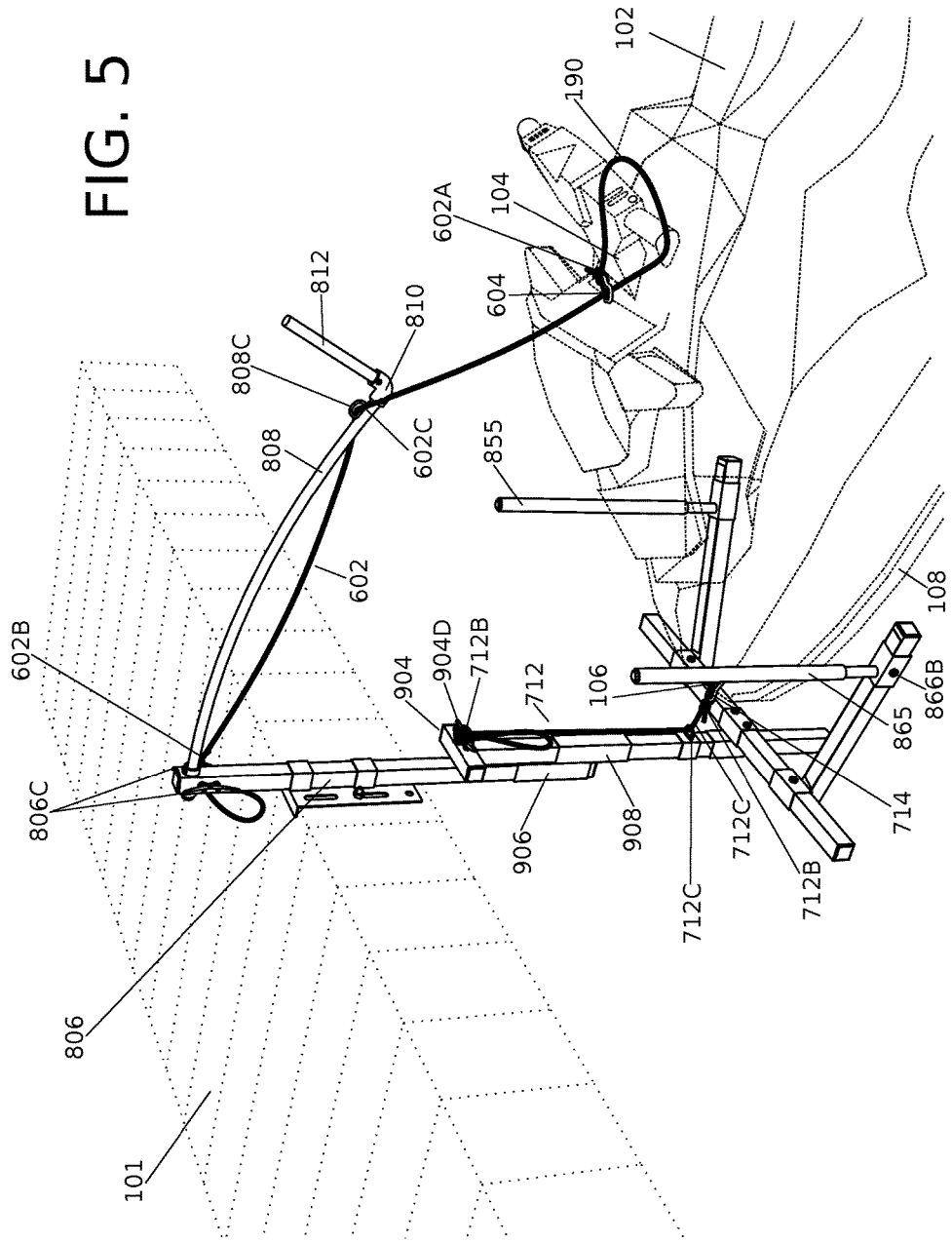
FIG. 5 is a left-front perspective view of a structure according to at least one embodiment of the invention in a configuration for docking a powered personal watercraft with a water level adjustment extension installed.

Referring now to the configuration of FIG. 4, FIG. 4 depicts a configuration of an embodiment similar to that of FIG. 6, for docking a personal boat 402, or equivalently, a paddleboat, rowboat, or other small, but wide watercraft. The docking configuration of FIG. 4 may be understood as bow to dock. The personal boat 402 includes a personal boat headrest attachment point 404, a personal boat bow attachment point 406, and a personal boat rim 408. The personal boat headrest attachment point 404 and personal boat bow attachment point 406 may be rigging loops provided by the watercraft manufacturer, or may be installed by the user on an aftermarket basis, for example using the U-bolts 1008 of a kit according to the embodiment of FIG. 10. The personal boat rim 408 is similar to the powered personal watercraft rim 108. In the configuration of FIG. 4, the structure 100 differs from that of FIG. 1 in that the arm member 808 is configured with its arc pointing down and the arm handle member 812 also pointing down. Additionally, the top rope clip 604 is attached to the personal boat headrest attachment point 404, and the bottom rope clip 614 is attached to the personal boat bow attachment point 406.

Referring still to the configuration of FIG. 4, an installation method for the configuration of FIG. 4 differs from that of FIG. 1 in that, at step (v), the arm member 808 is affixed to arc downward and, at step (vi), the arm handle member 812 is directed downward, and that at step (iii), the adjustment of the left-right and front back position of the first bumper member 855 and the second bumper member 865 is to a position that cradles the bow of the personal boat 402. In the configuration of FIG. 4, the method for parking is similar to the method for parking as in FIG. 1, except that the personal boat 402 is backed in to the structure 100 and that the top rope clip 604 is not clipped in a loop, but is clipped directly to the personal boat headrest attachment point 404. In the configuration of FIG. 4, the method for boarding is similar to the method for boarding is FIG. 1, except that the user need not pivot to be seated, but may simply step forward while grasping the arm handle member 812. Thus the arm member 808 may be understood to facilitate boarding and unboarding of the personal boat 402.

Figure 2:
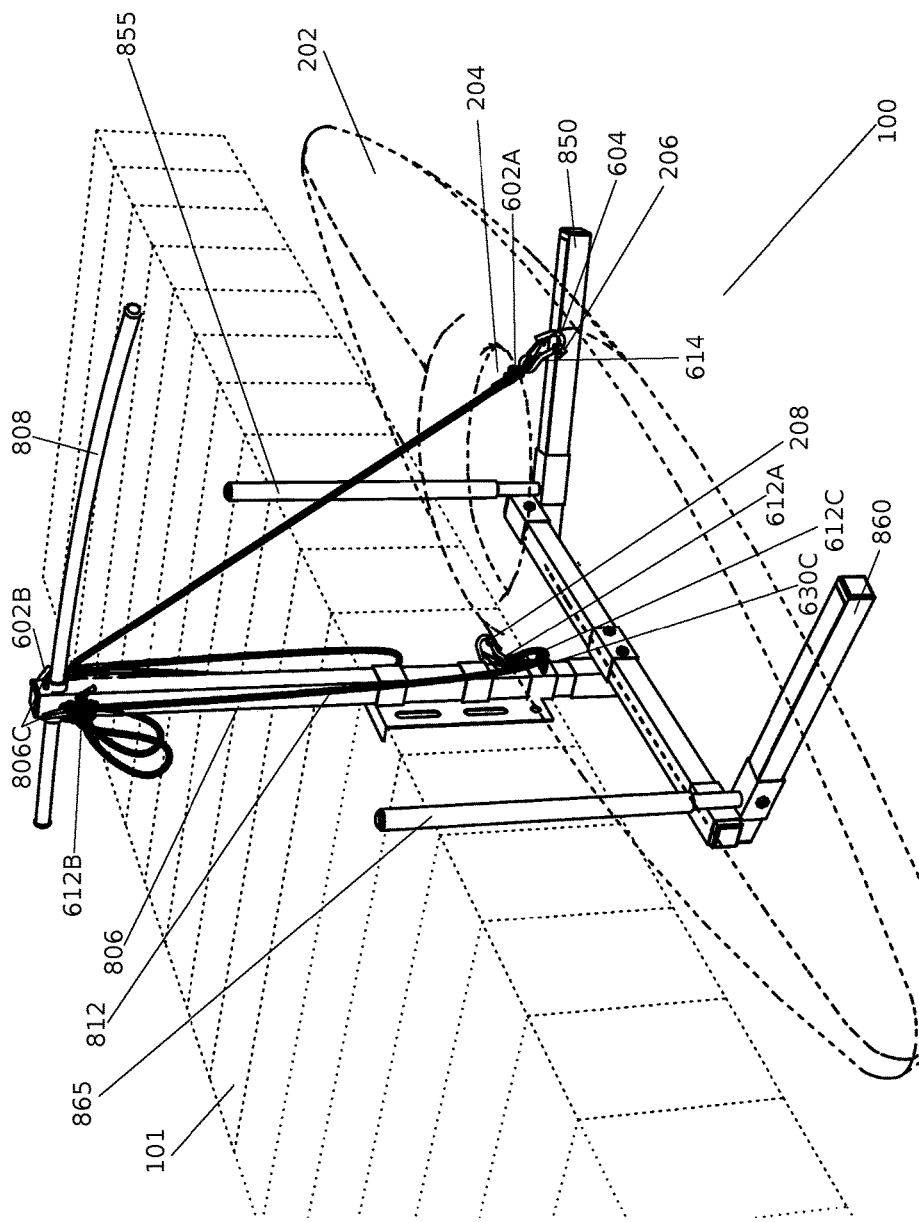
FIG. 2 is a left-front perspective view of a structure according to at least one embodiment of the invention in a configuration for docking a kayak upright.
Figure 3:
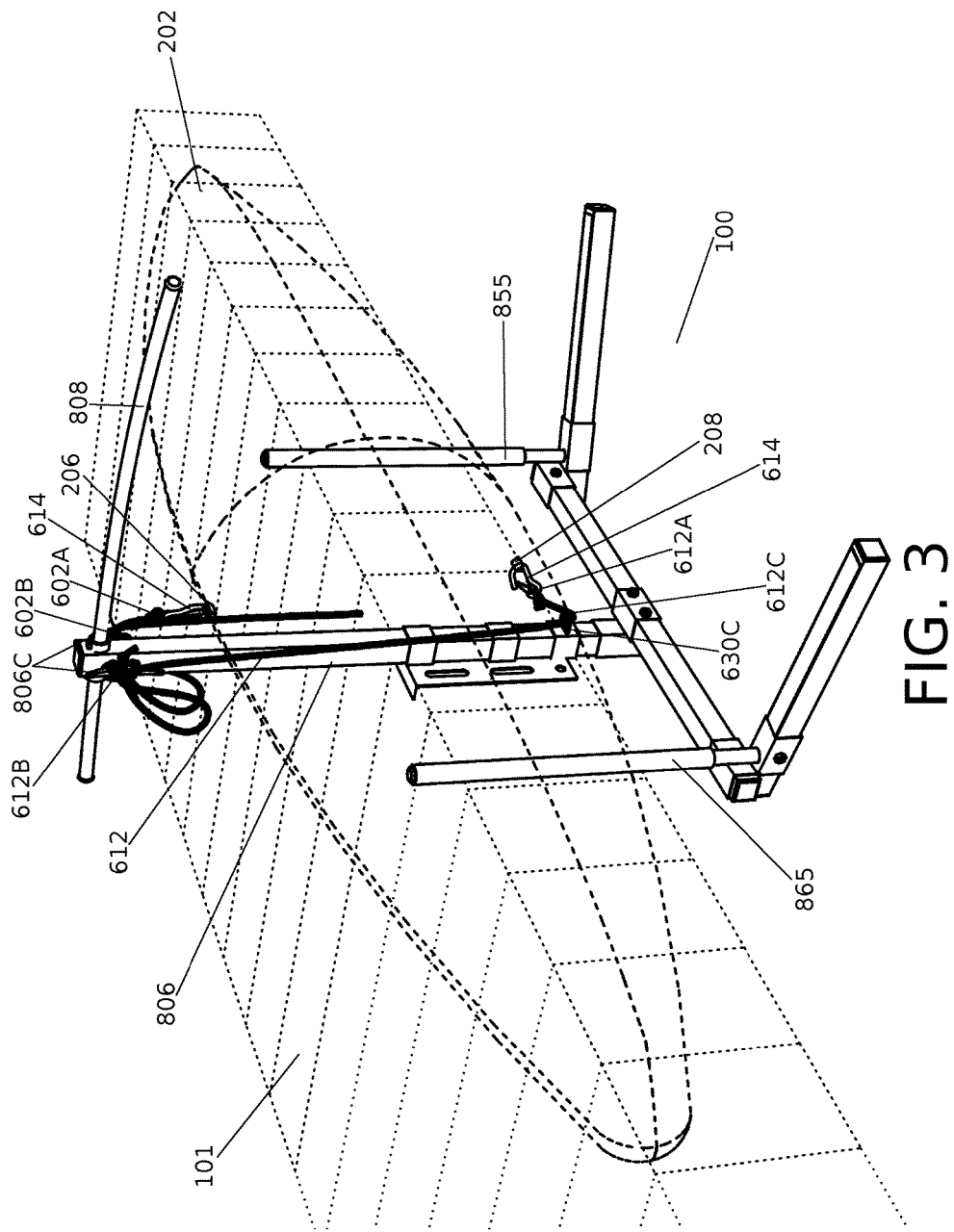
FIG. 3 is a left-front perspective view of a structure according to at least one embodiment of the invention in a configuration for docking a kayak on its side.

Referring now to FIGS. 2-3, FIGS. 2-3 depict various configurations of the structure 100 for docking a kayak 202, or, equivalently, another slender watercraft such as a canoe. In the configuration of FIGS. 2-3, the arm handle member 812 and arm elbow member 810 are not used, and the arm member 808 is passed through the arm receiving structure 806B to protrude from the vertical member 806 on the dockward side of the structure 100, thereby reducing the length that the arm member 808 extends outward from the vertical member 806. The arm member 808 is depicted without the arm loop 808C, which is not used in this configuration and may be removed, not installed in the first place, or otherwise not used. Also in the configuration of FIGS. 2-3, the first bumper arm slide member 852 and second bumper arm slide member 862 are positioned about maximally outward on the horizontal member 836, and the first bumper slide member 856 ad the second bumper slide member 866 are positioned about maximally inward on the first bumper arm member 850 and the second bumper arm member 860, respectively.

Referring still to the configuration of FIGS. 2-3, in the depicted embodiment, the kayak 202 includes a kayak cockpit 204, a kayak first attachment point 206, and a kayak second attachment point 208. The kayak cockpit 204 refers to the interior seating area of the kayak 202, as in the case of the depicted sit-inside style kayak 202, or to the exterior seating area or bench, as in the case of a sit-on-top kayak or canoe, respectively. The kayak first attachment point 206 and kayak second attachment point 208 are hitchable structures on the exterior of the kayak 202, which may be provided by the manufacturer or may be installed by the user on an aftermarket basis, for example using the U-bolts 1008 of a kit according to the embodiment of FIG. 10. In the case of sit-on-top kayaks, existing handles may be used as attachment points. In the case of sit-in kayaks, a user may drill holes in the crevasse of the coaming to accommodate one or more U-bolts 1008.

Referring still to the configuration of FIGS. 2-3, in the configuration of FIG. 2, the kayak 202 is stowed upright, resting on the first bumper arm member 850 and the second bumper arm member 860 and secured against the first bumper member 855 and second bumper member 865 by rope. Specifically, the bottom rope clip 614 is attached to the kayak second attachment point 208 and the top rope clip 604 is attached to the kayak first attachment point 206. In the configuration of FIG. 2, there is sufficient slack in the top rope 602 that the kayak 202 remains secured, but upright. To achieve the configuration of FIG. 3, slack may be taken up from the top rope 602 (and added to the bottom rope 612, as needed) to hoist the kayak 202 so that it hangs sideways against the first bumper member 855 and the second bumper member 865. The configuration of FIG. 3 may be understood as a storage configuration, wherein the kayak 202 is out of the water with its opening directed inward toward the dock 101, which prevents and/or minimizes and/or inhibits the accumulation of water and other environmental materials inside the kayak 202. As used herein, "other environmental materials" means at least dust, dirt, leaves, plant matter, insects, other windblown debris, and the like.

Referring still to the configuration of FIGS. 2-3, a method of installing the configuration of FIGS. 2-3 includes, given the above-described components, of FIG. 8, for example in a kit according to FIG. 10, in no preferred order: (i) affixing the bracket 802 to the dock 101, using a choice of bracket fasteners 802A appropriate to the material and style of the dock 101 and using the bracket backplate 804, if needed or desired; (ii) passing the horizontal member 836 through the lower joint horizontal member 832 such that the lower joint horizontal member 832 is centered on the horizontal member central region 836C and tightening the lower joint horizontal member fastener 832B; (iii) passing the horizontal member first end 836A through the second bumper arm slide member 862 and the horizontal member second end 836B through the first bumper arm slide member 852, and positioning the same near the outermost ends of the horizontal member 836, and tightening the aforementioned components with their respective fasteners; (iv) passing the first bumper arm member 850 through the first bumper slide member 856 and the second bumper arm member 860 through the second bumper arm slide member 862, and adjusting the same to near the innermost position on the first bumper arm member 850 and the second bumper member 865, respectively and tightening the aforementioned components with their respective fasteners; (v) passing the vertical member bottom end 806D through the vertical member receiving structures 802C, the lower loop member 830, and the lower joint vertical member 834 and tightening the respective fasteners such that the lower joint horizontal member 832 is at the water level or a desired distance above or below water level; (vi) passing the arm member 808 through the arm receiving structure 806B such that the arm member 808 curves downward and that the arm member 808 is extended partly outward from and partly through the vertical member 806; (vii) hitching the top rope second end 602B to one of the pair of cleats 806C; (viii) hitching the bottom rope second end 612B to one of the pair of cleats 806C, and passing the bottom rope 612 through the lower loop 830C. Optional additional installation steps include installing adhesive grip material 1002 on any of the dock 101, the first bumper member 855, the second bumper member 865, and the kayak 202. Optional steps further include installing a kayak first attachment point 206 and/or a kayak second attachment point 208 using the U-bolts 1008 from a kit of an embodiment according to FIG. 10.

Referring still to the configurations of FIGS. 2-3, a method of boarding and launching the kayak includes, for a kayak 202 starting in the configuration of FIG. 3, by a user standing on the dock 101, in no preferred order: (i) slackening the top rope 602, for example by releasing extra rope that may be secured to one of the pair of cleats 806C, such that the kayak 202 is released down into the configuration of FIG. 2, resting upright on the first bumper arm member 850 second bumper arm member 860 (embodiments of the method where the kayak 202 begins in the configuration of FIG. 2 may skip this step); (ii) grasping the arm member 808 and stepping into the kayak cockpit 204; (iii) sitting in the kayak cockpit 204, using the arm member 808 as a stable gripping point; (iv) detaching the bottom rope clip 614 from the kayak second attachment point 208 and the top rope clip 604 from the kayak second attachment point 208; (v) stowing the bottom rope 612 and the top rope 602 in a storage configuration, for example that of FIG. 6; and (vi) pushing off from the structure 100 into open water, for example by pulling down with one hand on the arm member 808 to reduce the friction force between the kayak 202 and the first bumper arm member 850 and the second bumper arm member 860, while pushing with the other hand on any of the first bumper member 855, the second bumper member 865, or the vertical member 806, or other component within reach of the user. To reverse the loading process, the user may paddle up to the structure 100, pull the kayak 202 up onto the first bumper arm member 850 and the second bumper arm member 860 by grabbing the arm member 808 or other component within reach, attaching the bottom rope 612 and the top rope 602, and climbing out of the kayak 202 using the arm member 808. Once unboarded, the user may optionally hoist the kayak 202 into the configuration of FIG. 3.

Referring now to FIGS. 11-17, FIGS. 11-17 depict an alternative embodiment for a structure 1100. In the embodiment of FIGS. 11-17, a bracket 1302 of rigid and resilient material includes a plurality of bracket mounting holes 1302B, one or more vertical member receiving structures 1302C, one or more vertical member receiving structure fasteners 1302D, and a bracket lip 1302E. The bracket 1302 may be affixed to the dock 101, with the bracket lip 1302E extending over the top edge of the dock 101, by bolts, screws, or other fasteners via the bracket mounting holes 1302B. Also in the embodiment of FIGS. 11-17, a vertical member 1306 of rigid and resilient material, such as square tube steel, is shaped complementarily to fit within the vertical member receiving structures 1302C. The vertical member 1306 includes a vertical member top end 1306A and a vertical member bottom end 1306D. Through the vertical member top end 1306A is an arm receiving structure 1306B. In the depicted embodiment, the arm receiving structure 1306B is a through-hole into which the arm member 1308 is inserted and secured there by nuts or other fasteners on both ends. The arm member 1308 is a tube, pipe, or conduit of rigid and resilient material; it includes an arm member first end 1308A and an arm member second end 1308B. The arm member second end 1308B may be threaded to accommodate the nuts of the arm receiving structure 806B.

Referring still to the embodiment depicted in FIGS. 11-17, the arm member 1308 includes an arm handle member 1312 affixed to the arm member first end 1308A. The arm handle member 1312, as shown, is a pair of opposed rigid loops or U-shaped handles attached to the arm member first end 1308A by welds, bolds, rivets, or other fasteners, or the arm member 1308 and arm handle member 1312 may be monolithically incorporated into the same component by molding, casting, 3D-printing, or other method of single component fabrication.

Referring still to the embodiment depicted in FIGS. 11-17, affixed to the vertical member bottom end 1306D are one or more lower ropes 1378. The lower ropes 1378 may be a single rope passed through a hole in the vertical member bottom end 1306D or separate ropes tied or clipped to attachment points thereon. A first bumper 1355 includes a first bumper top end 1355A and a first bumper bottom end 1355B, and a second bumper 1365 includes a second bumper top end 1365A and a second bumper bottom end 1365B. The lower ropes 1378 connect the vertical member bottom end 1306D to the first bumper bottom end 1355B and the second bumper bottom end 1365B. Atop rope 1370 attached to the first bumper top end 1355A and the second bumper top end 1365A is looped over the arm member 1308 through the arm handle member 1312, where it is retained by a rope sleeve 1372. Additionally, a central spacer bar 1374 is attached directly between the first bumper 1355 and the second bumper 1365. The central spacer bar 1374 may be affixed to attachment points on or within the first bumper 1355 and the second bumper 1365. The first bumper 1355 and the second bumper 1365 may be stock or modified off-the-shelf marine fenders or other padding/flotation devices, or they may be purpose-built as cylinders of flotation material and/or shock absorbing material.

Referring still to the embodiment of FIGS. 11-17, FIGS. 11-12 depict docking the powered personal watercraft 102 by contacting the bow of the powered personal watercraft 102 against the first bumper 1355 and the second bumper 1365. The result is that the bow of the powered personal watercraft 102 is under compression between the first bumper 1355 and the second bumper 1365. The powered personal watercraft 102 may be secured in the depicted position by tying to cleats on the dock 101. FIGS. 12-16 depict various views of the structure 1100 with the first bumper 1355 and the second bumper 1365 so urged apart by the powered personal watercraft 102. FIG. 17 depicts the first bumper 1355 and the second bumper 1365 in the absence of a separating force.

Referring now to at least some of the various embodiments, generally, a "bumper connecting structure" may be understood as any structure for connecting at least one bumper to a vertical member. For example, in the embodiment depicted in FIG. 8, the bumper connecting structure includes at least, for connecting the first bumper member 855 and the second bumper member 865 to the vertical member 806, the combination of the first bumper slide member 856, second bumper slide member 866, first bumper arm member 850, second bumper arm member 860, first bumper arm slide member 852, second bumper arm slide member 862, horizontal member 836, lower joint horizontal member 832, and lower joint vertical member 834. In the embodiment of FIG. 9, the bumper connecting structure includes at least the previously stated elements, plus the secondary vertical member 902, secondary extension slide member 908, and primary extension slide member 906. In addition to the embodiment of FIG. 9, the embodiment of FIG. 8 may be modified to slide up and down with the water level by allowing the vertical member 806 to slide up and down in the vertical member receiving structures 802C; for such embodiments, one or more stops or protrusions may be added to the vertical member 806 above or below the vertical member receiving structures 802C to keep it retained therein. Separately, in the context of the embodiment of FIGS. 11-17, the bumper connecting structure includes at least, for the first bumper 1355 and the second bumper 1365 to the vertical member 1306, the lower ropes 1378.

Similarly, an arm member, whether the arm member 808, arm member 1308, or another structure in accordance with the invention, may be understood as any member that extends in a cantilevered manner out from a main support over where a docked watercraft might be placed (at least, for embodiments installed on a dock with water present, neither of which are required for the practice of the invention).

In the various embodiments, the vertical member 806, the secondary vertical member 902, or more generally a vertical spine or structural member, may be understood to be a support. Thus, the bracket 802, the bracket 1302, or any other style of bracket, clamp, set of one or more bolts, set of one or more screws, set of one or more tension bands, and the like, may be understood as a support mounting means for mounting the support to the dock 101. A support, as described, would likewise affix to the arm member 808, arm member 1308, or any other rigid member that cantilevers to extend above a watercraft. In embodiments such as that depicted in FIG. 9, where a water level adjustment extension is present, the support may be understood to include a primary support slidably connected to a secondary support, as with the vertical member 806 slidably connected to the secondary vertical member 902 via the primary extension slide member 906 and the secondary extension slide member 908. In addition, for the embodiments of FIGS. 1-9, the first bumper member 855 and the second bumper member 865 may be understood as vertical rigid bumpers surrounded by a shock absorbing layer (first bumper shock absorbing layer 855C and second bumper shock absorbing layer 865C, respectively). More generally, any vertical rigid article with a compressible outer layer may be applied.

The watercraft, which may be any of the types of watercraft described herein, or, more generally, any floating article, may be contacted against the support via watercraft contacting means for contacting the structure of the particular embodiment to the watercraft. Either of, both of, or additional of the first bumper member 855 and the second bumper member 865, or the first bumper 1355 and the second bumper 1365, or any other contact article that allows the watercraft to contact the structure without damaging either may be understood as a contacting means, as described. With reference to the configuration of FIG. 3, the watercraft contacting means, regardless of how implemented, may be configured to retain the kayak 202 on its side, as with the first bumper member 855 and the second bumper member 865, which urge the kayak 202 not to swing or fall into an upright or upside down orientation while on its ropes.

Further, the top rope 602 and bottom rope 612, which clip to various points on a watercraft, may be understood as watercraft retaining means for retaining the watercraft to the dock 101. Alternatively, as in the embodiment of FIGS. 11-17, tying the watercraft to the dock 101 while positioned in contact with the structure may be understood as a watercraft retaining means as described. In the configuration of FIG. 2, the first bumper arm member 850 and the second bumper arm member 860, together, support the kayak 202 out of the water and thus may be understood as watercraft retaining means. More generally, any configuration of rigid structures, rope lines, compressible structures, permanent or electro magnets, adhesives, fluid thrusters, air thrusters, and the like that urges a watercraft to remain in contact with the structure may be understood as a watercraft retaining means.

Referring now to the materials used in various components of the various above-described embodiments, components described as rigid and resilient may be made of steel, aluminum, or other metal or metal alloy. These materials tend to be resistant to cracking in response to shifting internal loads, and also, unlike many plastics, do not photodegrade. Various high density and/or high impact plastic materials or composite materials (e.g., carbon fiber reinforced polymer, fiberglass, etc.) may also be used in the manufacture of various rigid and resilient components in the embodiments described above.

Referring still to the materials used in various components of the various above-described embodiments of the invention, the inventor contemplates that metal components frequently may be wet or submerged, potentially with seawater as well as fresh water. Accordingly, metal components are understood to be corrosion treated, for example by using stainless steel, or by applying electrolytic platings or chemical corrosion resistance treatments to non-stainless steel or other metal alloys. In other embodiments, metal components in contact with water may be placed in electrical communication with a sacrificial anode or placed under an impressed bias current resist corrosion.

Referring still to the materials used in various components of the various above-described embodiments of the invention, the various rope and line elements are contemplated as nylon or polyester fiber ropes of the kind customarily used in marine applications. Other rope materials, such as polypropylene, Kevlar, or other synthetic fibers, as well as cotton, hemp, and other natural fibers.

Components, component sizes, and materials listed above are preferable, but artisans will recognize that alternate components and materials could be selected without altering the scope of the invention.

While the foregoing written description of the invention enables one of ordinary skill to make and use what is presently considered to be the best mode thereof, those of ordinary skill in the art will understand and appreciate the existence of variations, combinations, and equivalents of the specific embodiment, method, and examples herein. The invention should, therefore, not be limited by the above described embodiment, method, and examples, but by all embodiments and methods within the scope and spirit of the invention.

I claim:

1. A watercraft docking structure, comprising:
   a bracket;
   a vertical member, said vertical member comprising a vertical member top end and a vertical member bottom end;
   said vertical member being affixed to said bracket;
   at least one bumper, said at least one bumper being affixed to said vertical member bottom end via a bumper connecting structure; and
   an arm member, said arm member comprising an arm member first end and an arm member second end;
   said arm member second end being affixed to said vertical member top end; and, wherein:
   said vertical member comprises a primary vertical member slidably connected to a secondary vertical member;
   said primary vertical member is affixed directly to said bracket and fixedly within a primary extension slide member;
   said primary extension slide member being affixed rigidly to and offset from a secondary extension slide member; and
   said secondary vertical member comprising a T-configuration structure that is passed through said secondary extension slide member and allowed to slide vertically therein.

2. The watercraft docking structure of claim 1, wherein said bumper connecting structure comprises:
   a horizontal member comprising a horizontal member first end and a horizontal member second end;
   said horizontal member being slidably-lockably affixed to said vertical member lower end;
   a first bumper arm member slidably-lockably affixed to said horizontal member first end; and
   a second bumper arm member slidably-lockably affixed to said horizontal member second end;
   and, wherein:
   at least one of said at least one bumper comprises a rigid bumper member surrounded by a shock absorbing layer;
   said at least one bumper comprises at least a first bumper and a second bumper;
   said first bumper being slidably-lockably affixed to said first bumper arm; and
   said second bumper being slidably-lockably affixed to said second bumper arm.

3. A watercraft docking structure, comprising:
   a bracket;
   a vertical member, said vertical member comprising a vertical member top end and a vertical member bottom end;
   said vertical member being affixed to said bracket;
   at least one bumper, said at least one bumper being affixed to said vertical member bottom end via a bumper connecting structure; and
   an arm member, said arm member comprising an arm member first end and an arm member second end;
   said arm member second end being affixed to said vertical member top end; and, wherein:
   said at least one bumper comprises a first bumper and a second bumper;
   said first bumper comprises a first cylinder of shock absorbing material, a first cylinder top end, and a first cylinder bottom end;
   said second bumper comprises a second cylinder of shock absorbing material, a second cylinder top end, and a second cylinder bottom end;
   said bumper connecting structure comprises at least one lower bumper rope linking said first cylinder bottom end to said vertical member bottom end and said second cylinder bottom end to said vertical member bottom end;
   an upper bumper rope links said first cylinder top end to said second cylinder top end via said arm member first end; and
   a central bumper rope links said first bumper to said second bumper.

4. The watercraft docking structure of claim 1, further comprising a handle member, said handle member being affixed to said arm member first end.

5. The watercraft docking structure of claim 4, wherein said handle member comprises a pair of opposed rigid loops.

6. The watercraft docking structure of claim 4, wherein said handle member comprises a single elongated member rotatably-lockably affixed at ninety degrees to said arm member second end.

7. The watercraft docking structure of claim 4, further comprising an arm loop, wherein said arm loop and said handle are distinct structures.

8. The watercraft docking structure of claim 1, further comprising at least one cleat affixed to said vertical member top end.

9. A watercraft docking structure, comprising:
   a support;
   affixed to said support, a support mounting means for mounting said support to a dock;
   affixed to said support, a watercraft contacting means for contacting said structure to a moored watercraft;
   an arm member comprising an arm member first end and an arm member second end;
   wherein said arm member is affixed to said support at said arm member second end; and
   wherein said arm member first end extends above the location of said moored watercraft; and, wherein:
   said support comprises a primary support slidably connected to a secondary support;
   said primary support is affixed directly to said support mounting means for mounting said support to said dock and affixed fixedly within a primary extension slide member;
   said primary extension slide member being affixed rigidly to and offset from a secondary extension slide member; and
   said secondary support comprising a T-configuration structure that is passed through said secondary extension slide member and allowed to slide vertically therein.

10. The watercraft docking structure of claim 9, further comprising a watercraft retaining means for retaining said watercraft to said dock, wherein said watercraft retaining means comprises at least one rope tied to at least one cleat affixed to said support.

11. The watercraft docking structure of claim 10, wherein:
    said watercraft is a powered personal watercraft; and
    said watercraft contacting means and said watercraft retaining means are configured to retain said powered personal watercraft to said dock, wherein said powered personal watercraft is oriented bow to dock and secured by said at least one rope affixed to at least one of a bow loop and a handlebar of said powered personal watercraft;
    whereby said arm member facilitates boarding and unboarding of said powered personal watercraft.

12. The watercraft docking structure of claim 10, wherein:
said watercraft is a kayak; and
said watercraft contacting means and said watercraft retaining means are configured to retain said kayak upright and parallel to said dock by said at least one rope being affixed to an attachment point of said kayak;
whereby said arm member facilitates boarding and unboarding of said kayak.

13. The watercraft docking structure of claim 10, wherein:
said watercraft is a kayak; and
said watercraft contacting means and said watercraft retaining means are configured to retain said kayak on its side by said at least one rope being affixed to an attachment point of said kayak;
whereby accumulation of at least one of water and other environmental materials inside of said kayak is inhibited.

14. The watercraft docking structure of claim 10, wherein:
said watercraft is a personal boat; and
said watercraft contacting means and said watercraft retaining means are configured to retain said personal boat to said dock, wherein said personal boat is oriented bow to dock and secured by said at least one rope affixed to at least one of a bow attachment point and a headrest attachment point of said personal boat;
whereby said arm member facilitates boarding and unboarding of said personal boat.

15. A watercraft docking structure, comprising:
a support;
affixed to said support, a bracket;
affixed to said support via a bumper connecting structure, at least one bumper;
affixed to said support, an arm member;
at least one cleat affixed to said support; and, wherein:
said support comprises a primary support slidably connected to a secondary support;
said primary support is affixed directly to said support mounting means for mounting said support to said dock and affixed fixedly within a primary extension slide member;
said primary extension slide member being affixed rigidly to and offset from a secondary extension slide member; and
said secondary support comprising a T-configuration structure that is passed through said secondary extension slide member and allowed to slide vertically therein.

16. The watercraft docking structure of claim 15, further comprising a handle, said handle being affixed to said arm member.

17. The watercraft docking structure of claim 15, wherein said at least one bumper comprises at least one vertical rigid bumper member surrounded by a shock absorbing layer.

* * * * *